(12) United States Patent
Lee et al.

(10) Patent No.: US 9,598,088 B2
(45) Date of Patent: Mar. 21, 2017

(54) DRIVER ASSISTANCE APPARATUS CAPABLE OF RECOGNIZING A ROAD SURFACE STATE AND VEHICLE INCLUDING THE SAME

(71) Applicant: LG ELECTRONICS INC., Seoul (KR)

(72) Inventors: Hansung Lee, Seoul (KR); Soohwan Choi, Seoul (KR); Jaehyuk Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 14/691,785

(22) Filed: Apr. 21, 2015

(65) Prior Publication Data
US 2016/0001780 A1    Jan. 7, 2016

(30) Foreign Application Priority Data
Jul. 2, 2014    (KR) .................... 10-2014-0082591

(51) Int. Cl.
| G05D 1/00 | (2006.01) |
| B60W 40/06 | (2012.01) |
| G06K 9/00 | (2006.01) |
| B60R 1/00 | (2006.01) |
| B60W 10/18 | (2012.01) |
| B60W 10/20 | (2006.01) |

(52) U.S. Cl.
CPC .............. *B60W 40/06* (2013.01); *B60R 1/00* (2013.01); *B60W 10/18* (2013.01); *B60W 10/20* (2013.01); *G06K 9/00791* (2013.01); *B60R 2300/107* (2013.01); *B60R 2300/8053* (2013.01)

(58) Field of Classification Search
CPC ........... G06K 9/00798; G06K 9/00791; G06K 9/00818; G01S 17/023; G08G 1/096716

USPC ............ 701/1, 25, 36, 45, 48, 117; 340/905; 348/108; 382/108
See application file for complete search history.

(56) References Cited

U.S. PATENT DOCUMENTS

| 4,690,553 A | 9/1987 | Fukamizu et al. |
| 6,459,083 B1 | 10/2002 | Finkele et al. |
| 8,306,712 B2 | 11/2012 | Deng et al. |

(Continued)

FOREIGN PATENT DOCUMENTS

| JP | 2013-068986 | 4/2013 |
| KR | 10-2011-0061741 | 6/2011 |

(Continued)

OTHER PUBLICATIONS

Korean Office Action dated May 11, 2015.
Jong Hoon Kim,etc 1; "A Development of the Road Surface Decision Algorithm Using SVM (Support Vector Machine) Clustering Methods",The Korea Intelligent Transportation System, Items 12, No. 5, Oct. 2013, pp. 1-12.
Raj et al., "Vision based road surface detection for automotive systems", Sep. 5-7, 2012, pp. 223-228, 2012 International Conference on Applied Electronics (AE), available at http://ieeexplore.ieee.org/xpl/articleDetails.jsp?arnumber=6328908.

(Continued)

*Primary Examiner* — Gertrude Arthur Jeanglaud
(74) *Attorney, Agent, or Firm* — KED & Associates LLP

(57) ABSTRACT

A driver assistance apparatus and a vehicle including the same are disclosed. The driver assistance apparatus includes a stereo camera, a memory to store road surface data regarding a state of a road surface classified into a dry state, a wet state, a snow covered state, and an icy state, and a processor to classify the state of the road surface as any one of the dry state, the wet state, the snow covered state, and the icy state based on stereo images received from the stereo camera and the road surface data. Consequently, it is possible to recognize a current road surface state.

20 Claims, 23 Drawing Sheets

(56) References Cited

U.S. PATENT DOCUMENTS

| | | | |
|---|---|---|---|
| 9,139,204 B1* | 9/2015 | Zhao | B60W 40/064 |
| 2004/0193347 A1* | 9/2004 | Harumoto | B60T 8/1755 |
| | | | 701/45 |
| 2005/0167593 A1* | 8/2005 | Forsyth | G01N 21/314 |
| | | | 250/339.11 |
| 2008/0129541 A1* | 6/2008 | Lu | G06K 9/00791 |
| | | | 340/905 |
| 2011/0060478 A1* | 3/2011 | Nickolaou | G01S 17/023 |
| | | | 701/1 |
| 2012/0001771 A1 | 1/2012 | Roth et al. | |
| 2012/0069181 A1* | 3/2012 | Xue | G01J 3/0229 |
| | | | 348/148 |
| 2014/0081573 A1 | 3/2014 | Urmson et al. | |
| 2015/0178572 A1* | 6/2015 | Omer | G06K 9/00798 |
| | | | 382/108 |

FOREIGN PATENT DOCUMENTS

| | | |
|---|---|---|
| KR | 10-2012-0130212 | 11/2012 |
| KR | 10-2013-0141112 | 12/2013 |
| KR | 10-2014-0062334 | 5/2014 |

OTHER PUBLICATIONS

Fujimura et al., "Road Surface Sensor", pp. 64-72, Fujitsu Ten Technical Journal No. 1 (1988), available at http://www.fujitsu-ten.com/business/technicaljournal/pdf/1-6E.pdf.
Korean Office Action dated Nov. 23, 2015.
European Search Report dated Nov. 30, 2015.
Erich Bruns et al.; "Adaptive Training of Video Sets for Image Recognition on Mobile Phones"; Personal and Ubiquitous Computing; vol. 13, No. 2, Mar. 5, 2008; pp. 165-178; XP058023731; ISSN: 1617-4909.

* cited by examiner

DRIVER ASSISTANCE APPARATUS CAPABLE OF RECOGNIZING A ROAD SURFACE STATE AND VEHICLE INCLUDING THE SAME

CROSS-REFERENCE TO RELATED APPLICATION

This application claims priority under 35 U.S.C. §119 to Korean Patent Application No. 10-2014-0082591, filed on Jul. 2, 2014, whose entire disclosure is hereby incorporated by reference.

BACKGROUND OF THE INVENTION

1. Field of the Invention

The present disclosure relates to a driver assistance apparatus and a vehicle including the same and, more particularly, to a driver assistance apparatus that is capable of recognizing a road surface state and a vehicle including the same.

2. Description of the Related Art

A vehicle is a device that allows a driver to move in a desired direction. A representative example of the vehicle may be a car.

In order to improve convenience of a user who uses the vehicle, the vehicle has been equipped with various sensors and electronic devices. In particular, various devices to improve driving convenience of the user have been developed.

SUMMARY OF THE INVENTION

It is an object of the present disclosure to provide a driver assistance apparatus that is capable of recognizing a road surface state and a vehicle including the same.

In accordance with an aspect of the present disclosure, the above and other objects can be accomplished by the provision of a driver assistance apparatus including a stereo camera, a memory to store road surface data regarding a state of a road surface classified into a dry state, a wet state, a snow covered state, and an icy state, and a processor to classify the state of the road surface as any one of the dry state, the wet state, the snow covered state, and the icy state based on stereo images received from the stereo camera and the road surface data.

In accordance with another aspect of the present disclosure, there is provided a vehicle including a steering drive unit to drive a steering apparatus, a brake drive unit to drive a brake apparatus, a controller to control the steering drive unit and the brake drive unit, a stereo camera, a memory to store road surface data regarding a state of a road surface classified into a dry state, a wet state, a snow-covered state, and an icy state, and a processor to classify the state of the road surface as any one of the dry state, the wet state, the snow-covered state, and the icy state based on stereo images received from the stereo camera and the road surface data.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Exemplary embodiments of the present disclosure will be described with reference to the attached drawings.

The terms "module" and "unit," when attached to the names of components are used herein to help the understanding of the components and thus they should not be considered as having specific meanings or roles. Accordingly, the terms "module" and "unit" may be used interchangeably.

A vehicle as described in this specification may include a car and a motorcycle. Hereinafter, a description will be given based on a car.

On the other hand, a vehicle as described in this specification may include a vehicle having an engine, a hybrid vehicle having an engine and an electric motor, and an electric vehicle having an electric motor, and the like. Hereinafter, a description will be given based on a vehicle having an engine.

Meanwhile, A driver assistance apparatus as described in this specification may be an advanced driver assistance system (ADAS) or an advanced driver assistance apparatus (ADAA). Hereinafter, a description will be given of various embodiments of a driver assistance apparatus according to the present disclosure and a vehicle including the same.

Figure 1:
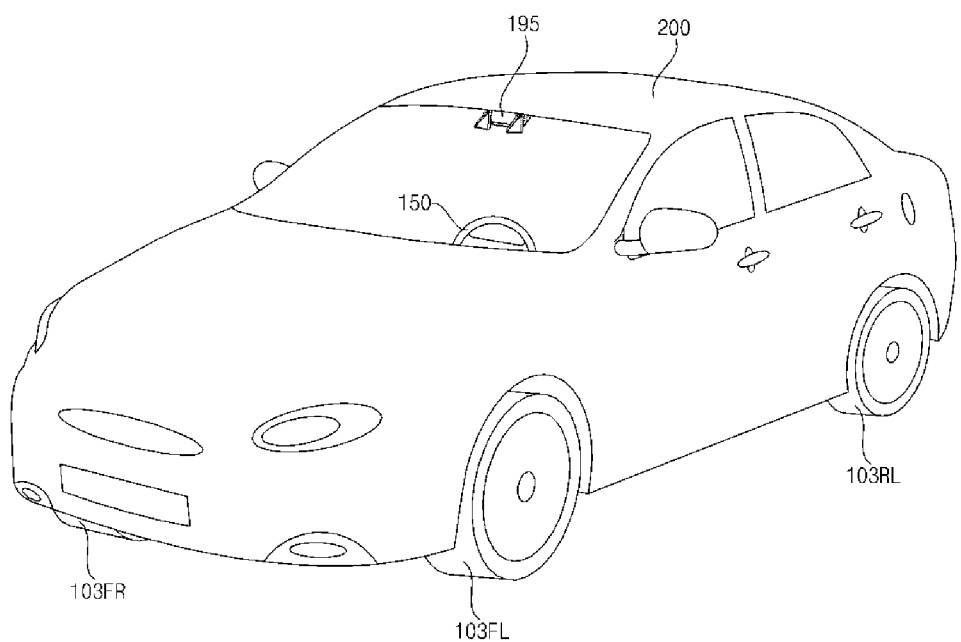
FIG. 1 is a view showing the external appearance of a vehicle having a stereo camera according to an embodiment of the present disclosure.

FIG. 1 is a view showing the external appearance of a vehicle having a stereo camera according to an embodiment of the present disclosure.

Referring to FIG. 1, a vehicle 200 may include wheels 103FR, 103FL, 103RL, and the like, a steering wheel 150, and a stereo camera 195 provided in the vehicle 200.

The stereo camera 195 may include a plurality of cameras. Stereo images acquired by the cameras may be signal-processed in a driver assistance apparatus 100 (see FIG. 3). By way of example, the stereo camera 195 includes two cameras.

Figure 2:
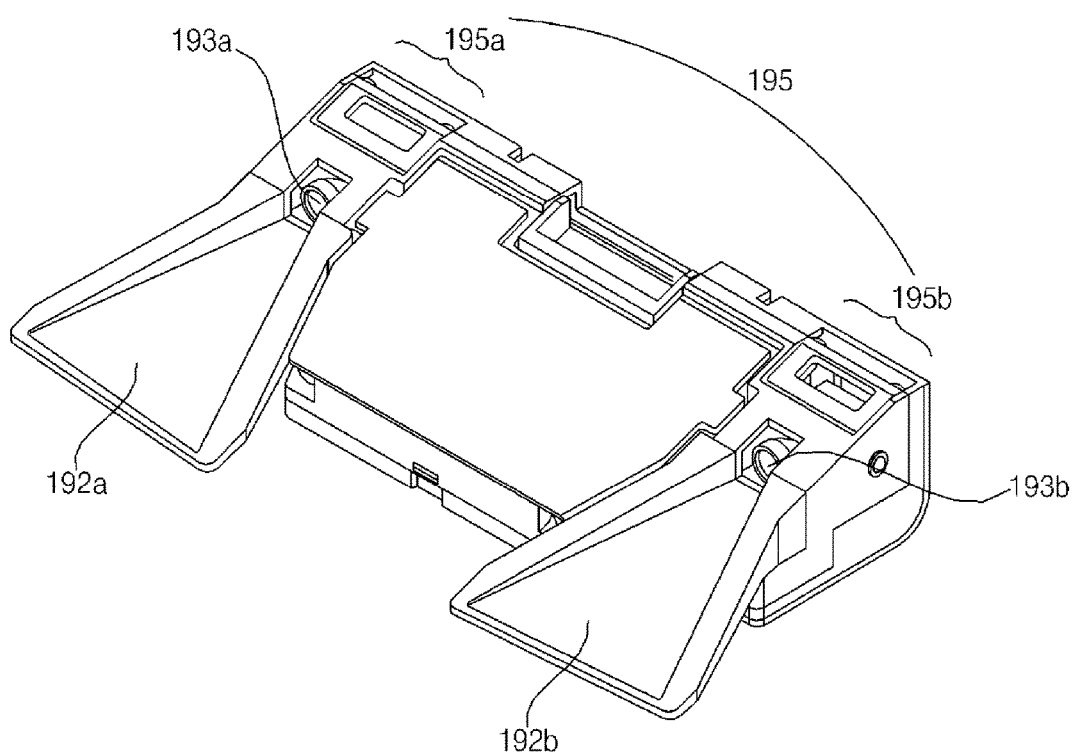
FIG. 2 is a view showing the external appearance of the stereo camera attached to the vehicle shown in FIG. 1.

FIG. 2 shows the external appearance of the stereo camera attached to the vehicle shown in FIG. 1.

Referring to FIG. 2, the stereo camera 195 may include a first camera 195a having a first lens 193a and a second camera 195b having a second lens 193b.

In addition, the stereo camera 195 may further include a first light shield unit 192a to shield light falling incident upon the first lens 193*a* and a second light shield unit 192*b* to shield light falling incident upon the second lens 193*b*.

The stereo camera 195 shown in FIG. 2 may be detachably attached to a ceiling or a front windshield glass of the vehicle 200.

The driver assistance apparatus 100 (see FIG. 3) having the stereo camera 195 may acquire stereo images for a view forward or ahead of the vehicle from the stereo camera 195, detect disparity based on the stereo images, detect an object for at least one of the stereo images based on disparity information, and continuously track motion of the object after detection of the object.

Figure 3A:
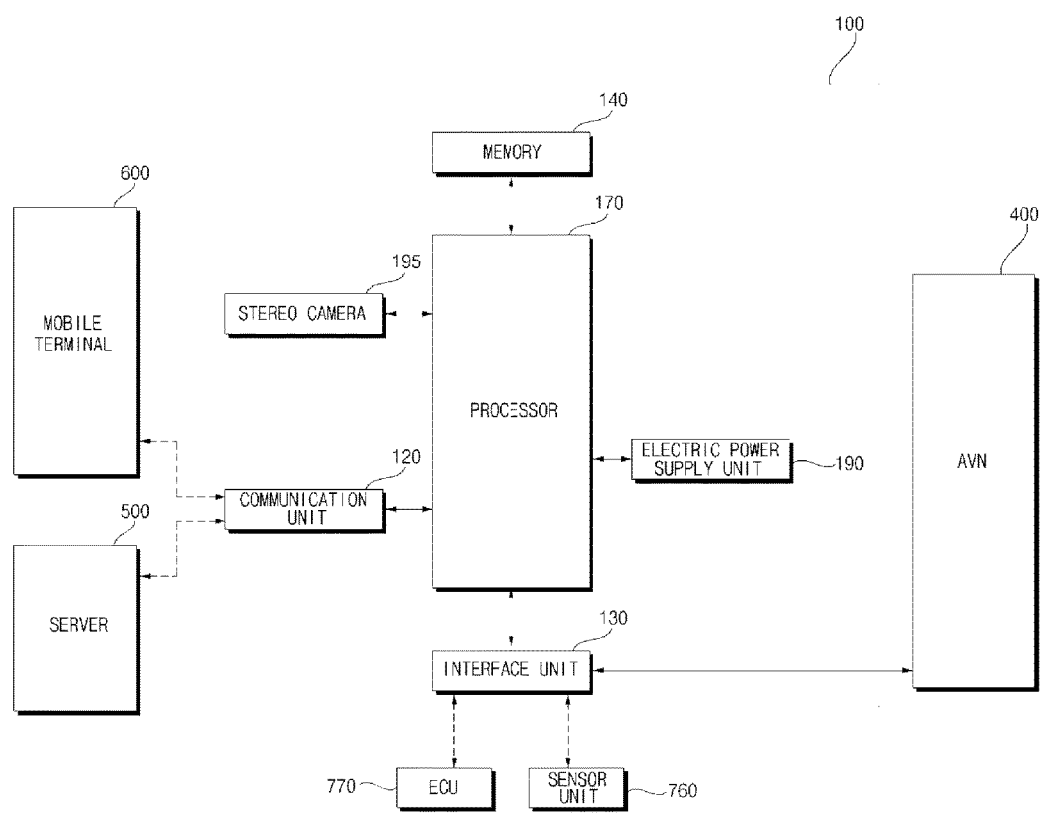
FIGS. 3A and 3B are internal block diagrams showing various examples of a driver assistance apparatus according to an embodiment of the present disclosure.
Figure 3B:
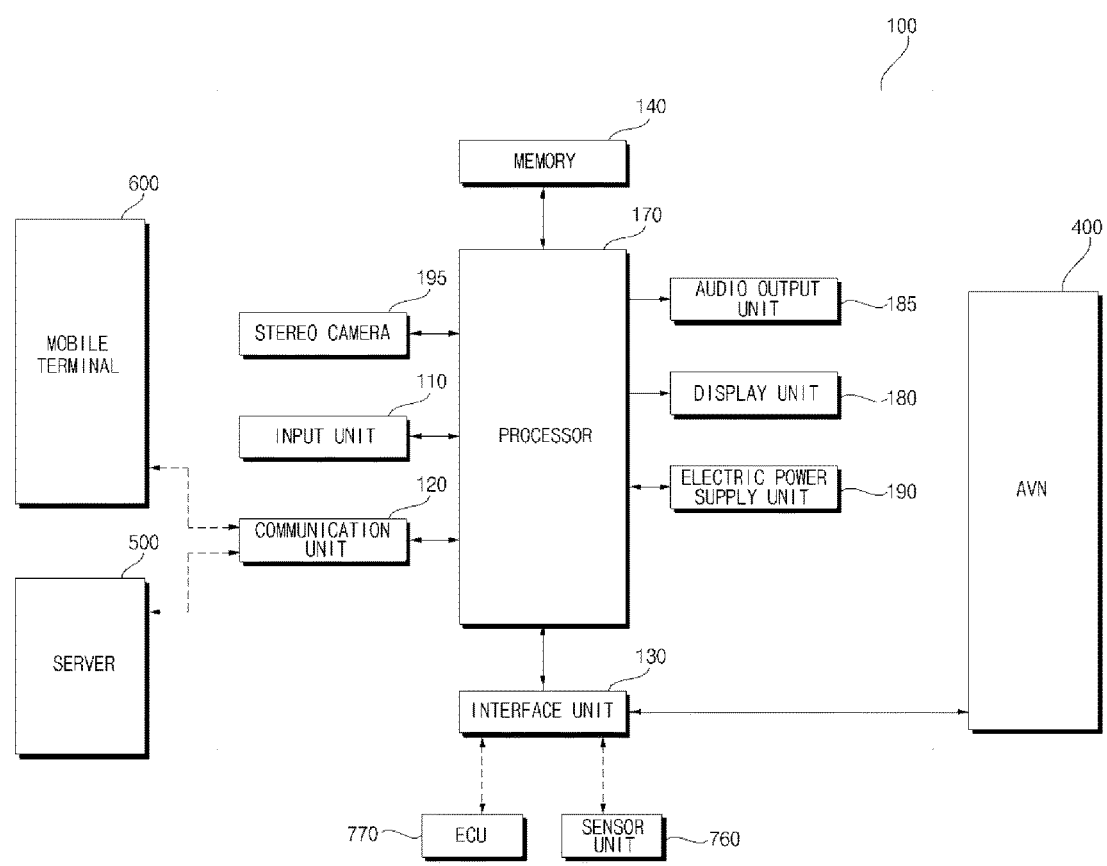

FIGS. 3A and 3B are internal block diagrams showing various examples of a driver assistance apparatus according to an embodiment of the present disclosure.

Referring to FIGS. 3A and 3B, the driver assistance apparatus 100 may signal-process stereo images received from the stereo camera 195 based on computer vision to generate vehicle-related information. Computer vision includes methods for acquiring, processing, analyzing, and understanding images and, in general, high-dimensional data from the real world in order to produce numerical or symbolic information, e.g., in the forms of decisions to duplicate the abilities of human vision by electronically perceiving and understanding an image. This image understanding can be seen as the disentangling of symbolic information from image data using models constructed with the aid of geometry, physics, statistics, and learning theory. The image data can take many forms, such as video sequences, views from multiple cameras, or multi-dimensional data. The vehicle-related information may include vehicle control information for direct control of the vehicle or driver assistance information for driving guidance provided to a driver.

Referring first to FIG. 3A, the driver assistance apparatus 100 may include a communication unit 120, an interface unit 130, a memory 140, a processor 170, an electric power supply unit 190, and a stereo camera 195.

The communication unit 120 may exchange data with a mobile terminal 600 or a server 500 in a wireless fashion. In particular, the communication unit 120 may exchange data with a mobile terminal of the driver in a wireless fashion. To this end, various wireless data communication protocols, such as Bluetooth, Wi-Fi, Wi-Fi Direct, and APiX, may be used.

The communication unit 120 may receive weather information and road traffic state information, such as Transport Protocol Expert Group (TPEG) information, from the mobile terminal 600 or the server 500. On the other hand, the communication unit 120 may transmit real-time traffic information acquired by the driver assistance apparatus 100 based on stereo images to the mobile terminal 600 or the server 500.

When a user gets into the vehicle, a mobile terminal 600 of the user may pair with the driver assistance apparatus 100 automatically or by the user executing a pairing application.

The interface unit 130 may receive vehicle-related data or transmit a signal processed or generated by the processor 170 to the outside. To this end, the interface unit 130 may perform data communication with an electronic control unit (ECU) 770, an audio and video navigation (AVN) apparatus 400, and a sensor unit 760 in the vehicle in a wired communication fashion or a wireless communication fashion.

The interface unit 130 may receive map information related to vehicle travel through data communication with the AVN apparatus 400.

On the other hand, the interface unit 130 may receive sensor information from the ECU 770 and the sensor unit 760.

The sensor information may include at least one of vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information.

The sensor information may be acquired by a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, or an in-vehicle humidity sensor. The position module may include a global positioning system (GPS) module to receive GPS information.

Of the above-specified sensor information, the vehicle heading information, the vehicle position information, the vehicle angle information, the vehicle speed information, and the vehicle tilt information, which are related to vehicle travel, may be referred to as vehicle travel information.

The memory 140 may store various data related to overall operation of the driver assistance apparatus 100, such as programs for processing or control of the processor 170.

An audio interface unit (not shown) may convert an electric signal received from the processor 170 into an audio signal and outputs the audio signal. To this end, the audio interface unit (not shown) may include a speaker. The audio interface unit (not shown) may output a sound corresponding to an operation of a user input unit (not shown), e.g. a user input control.

An audio input unit (not shown) may receive a user's voice. To this end, the audio input unit (not shown) may include a microphone. The received voice may be converted into an electric signal, which may be transmitted to the processor 170.

The processor 170 controls overall operation of each unit in the driver assistance apparatus 100.

In particular, the processor 170 performs signal processing based on computer vision. Consequently, the processor 170 may acquire stereo images for a view ahead of the vehicle from the stereo camera 195, calculate disparity for the view ahead of the vehicle based on the stereo images, detect an object for at least one of the stereo images based on calculated disparity information, and continuously track motion of the object after detection of the object.

In particular, during detection of the object, the processor 170 may perform lane marker detection (LD), adjacent vehicle detection (VD), pedestrian detection (PD), bright spot detection (BD), traffic sign recognition (TSR), and road surface detection.

In addition, the processor 170 may calculate the distance to the detected adjacent vehicle, speed of the detected adjacent vehicle, and a difference in speed with the detected adjacent vehicle.

Meanwhile, the processor 170 may receive weather information and road traffic state information, such as TPEG information, through the communication unit 120.

On the other hand, the processor 170 may acquire, in real time, traffic-around-vehicle state information acquired by the driver assistance apparatus 100 based on stereo images.

Meanwhile, the processor 170 may receive map information from the AVN apparatus 400 through the interface unit 130.

On the other hand, the processor 170 may receive sensor information from the ECU 770 or the sensor unit 760 through the interface unit 130. The sensor information may include at least one of vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, and in-vehicle humidity information.

The electric power supply unit 190 may supply electric power to the respective components under control of the processor 170. In particular, electric power from an in-vehicle battery may be supplied to the electric power supply unit 190.

The stereo camera 195 may include a plurality of cameras. In the following description, it is assumed that the stereo camera 195 includes two cameras as previously described with reference to FIG. 2.

The stereo camera 195 may be detachably attached to a ceiling or a front windshield glass of the vehicle 200. The stereo camera 195 may include a first camera 195a having a first lens 193a and a second camera 195b having a second lens 193b.

In addition, the stereo camera 195 may further include a first light shield unit 192a to shield light incident upon the first lens 193a and a second light shield unit 192b to shield light incident upon the second lens 193b.

Referring now to FIG. 3B, the driver assistance apparatus 100 of FIG. 3B may further include an input unit 110, a display unit 180, and an audio output unit 185 as compared with the driver assistance apparatus 100 of FIG. 3A. Hereinafter, a description will be given for only user input unit 110, the display unit 180, and the audio output unit 185.

The user input unit 110 may include a plurality of user input controls or a touchscreen attached to the driver assistance apparatus 100, specifically to the stereo camera 195. The driver assistance apparatus 100 may be powered on through the user input controls or the touchscreen such that the driver assistance apparatus 100 is operated. In addition, various input operations may be performed through the input unit 110.

The audio output unit 185 outputs a sound based on an audio signal processed by the processor 170 to the outside. To this end, the audio output unit 185 may include at least one speaker.

The display unit 180 may display an image related to an operation of the driver assistance apparatus. In order to display such an image, the display unit 180 may include a cluster or a head up display (HUD) provided at the inside front of the vehicle. In a case in which the display unit 180 is the HUD, the display unit 180 may include a projection module to project an image on the front windshield glass of the vehicle 200.

Figure 4A:
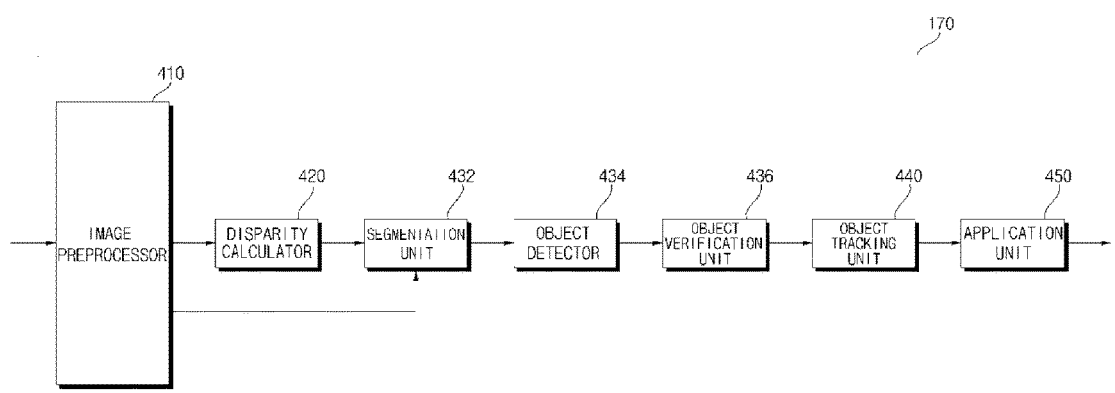
FIGS. 4A and 4B are internal block diagrams showing various examples of a processor shown in FIGS. 3A and 3B.
Figure 4B:
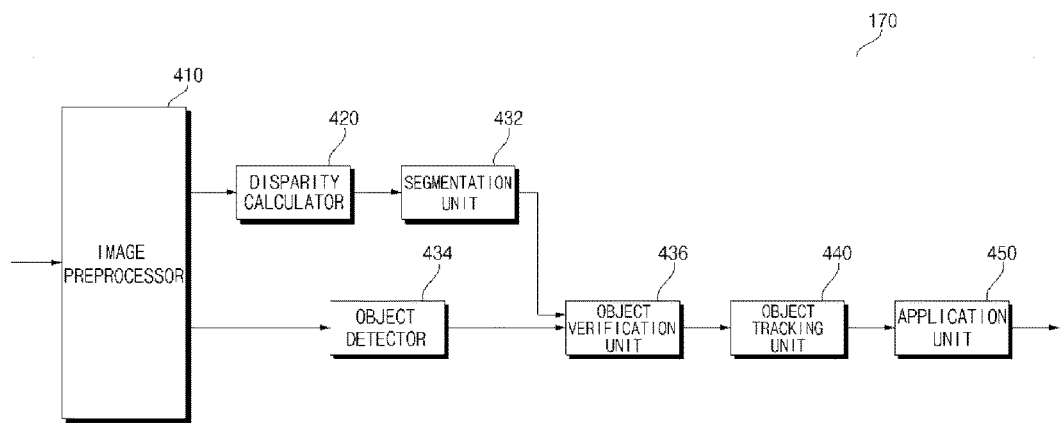

FIGS. 4A and 4B are internal block diagrams showing various examples of the processor shown in FIGS. 3A and 3B and FIGS. 5A and 5B are reference views illustrating operations of the processors shown in FIGS. 4A and 4B.

Referring first to FIG. 4A, which is an internal block diagram showing an example of the processor 170, the processor 170 of the driver assistance apparatus 100 may include an image preprocessor 410, a disparity calculator 420, a segmentation unit 432, an object detector 434, an object verification unit 436, an object tracking unit 440, and an application unit 450.

The image preprocessor 410 receives stereo images from the stereo camera 195 and preprocesses the received stereo images.

Specifically, the image preprocessor 410 may perform noise reduction, rectification, calibration, color enhancement, color space conversion (CSC), interpolation, and camera gain control for the stereo images. As a result, the image preprocessor 410 may acquire stereo images more vivid than the stereo images photographed by the stereo camera 195.

The disparity calculator 420 may receive the stereo images signal-processed by the image preprocessor 410, perform stereo matching for the received stereo images, and acquire a disparity map based on the stereo matching. That is, the disparity calculator 420 may acquire disparity information of stereo images for a view ahead of the vehicle.

The stereo matching may be performed on a per pixel basis or a per predetermined block basis of the stereo images. Meanwhile, the disparity information may be included in a map showing binocular parallax information as values.

The segmentation unit 432 may perform segmentation and clustering for at least one of the stereo images based on the disparity information from the disparity calculator 420.

Specifically, the segmentation unit 432 may segment at least one of the stereo images into a background and a foreground based on the disparity information.

For example, a region having a predetermined value or less of the disparity information in the disparity map may be calculated as a background and the region may be excluded. As a result, a foreground may be relatively separated from the stereo image.

In another example, a region having a predetermined value or more of the disparity information in the disparity map may be calculated as a foreground and the region may be extracted. As a result, the foreground may be separated from the stereo image.

As described above, the stereo image is segmented into the background and the foreground based on the disparity information extracted based on the stereo image. Therefore, signal processing speed and signal processing amount may be reduced during detection of an object.

The object detector 434 may detect an object based on the image segment from the segmentation unit 432. That is, the object detector 434 may detect an object for at least one of the stereo images based on the disparity information. For example, the object detector 434 may detect an object from a foreground separated from the stereo image by the image segment. Subsequently, the object verification unit 436 classifies and verifies the separated object.

To this end, the object verification unit 436 may use a recognition method using a neural network, a support vector machine (SVM) method, a recognition method based on AdaBoost using a Haar-like feature, or a histograms of oriented gradients (HOG) method or another appropriate technique.

On the other hand, the object verification unit 436 may compare the detected object with objects stored in the memory 140 to verify the detected object.

For example, the object verification unit 436 may verify an adjacent vehicle, a lane marker, a road surface, a traffic sign, a dangerous zone, a tunnel, and the like located around the vehicle.

The object tracking unit 440 tracks the verified object. For example, the object tracking unit 440 may verify an object in stereo images which are sequentially acquired, calculate motion or a motion vector of the verified object, and track movement of the object based on the calculated motion or the calculated motion vector. Consequently, the object tracking unit 440 may track an adjacent vehicle, a lane marker, a road surface, a traffic sign, a dangerous zone, a tunnel, and the like located around the vehicle.

Subsequently, the application unit 450 may calculate a risk of the vehicle 200 based on various objects, such as adjacent vehicle, a lane marker, a road surface, and a traffic sign, located around the vehicle. In addition, the application unit 450 may calculate a possibility of a rear-end collision with a preceding vehicle, slip of the vehicle, and the like.

In addition, the application unit 450 may output a message informing a user of the following information as driver assistance information based on the calculated risk, the calculated possibility of the rear-end collision, or the calculated slip of the vehicle. Alternatively, the application unit 450 may generate a control signal for attitude control or travel control of the vehicle 200 as vehicle control information.

FIG. 4B is an internal block diagram showing another example of the processor 170.

Referring to FIG. 4B, the processor 170 of FIG. 4B is substantially similar in construction to the processor 170 of FIG. 4A except that a signal processing sequence of the processor 170 of FIG. 4B is different from that of the processor 170 of FIG. 4A. Hereinafter, a description will be given for only the differences between the processor 170 of FIG. 4B and the processor 170 of FIG. 4A.

The object detector 434 may receive stereo images and detect an object for at least one of the stereo images. Unlike FIG. 4A, the object detector 434 may not detect an object for an image segmented based on disparity information but directly detect an object from a stereo image.

Subsequently, the object verification unit 436 classifies and verifies the detected and separated object based on the image segment from the segmentation unit 432 and the object detected by the object detector 434.

To this end, the object verification unit 436 may use a recognition method using a neural network, an SVM method, a recognition method based on AdaBoost using a Haar-like feature, or a HOG method.

Figure 5A:
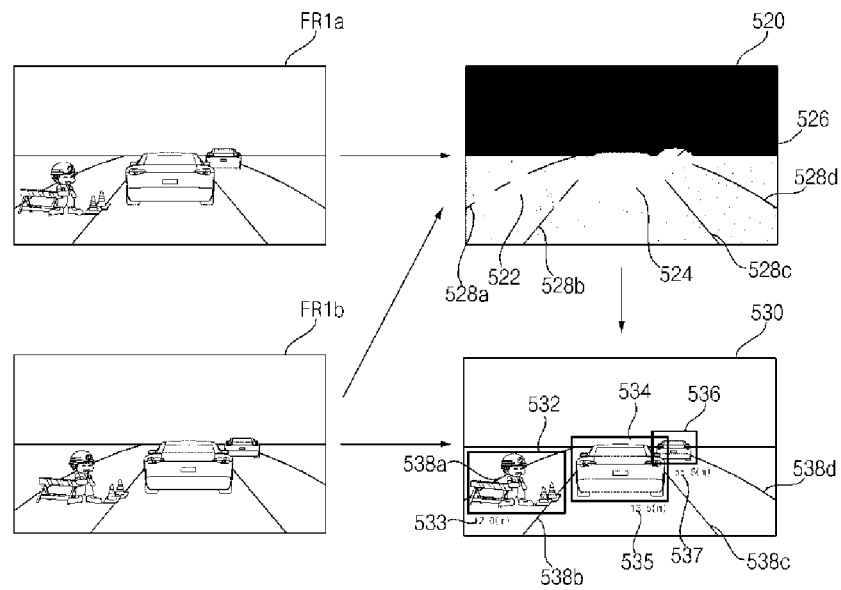
FIGS. 5A and 5B are reference views illustrating operations of the processors shown in FIGS. 4A and 4B.
Figure 5B:
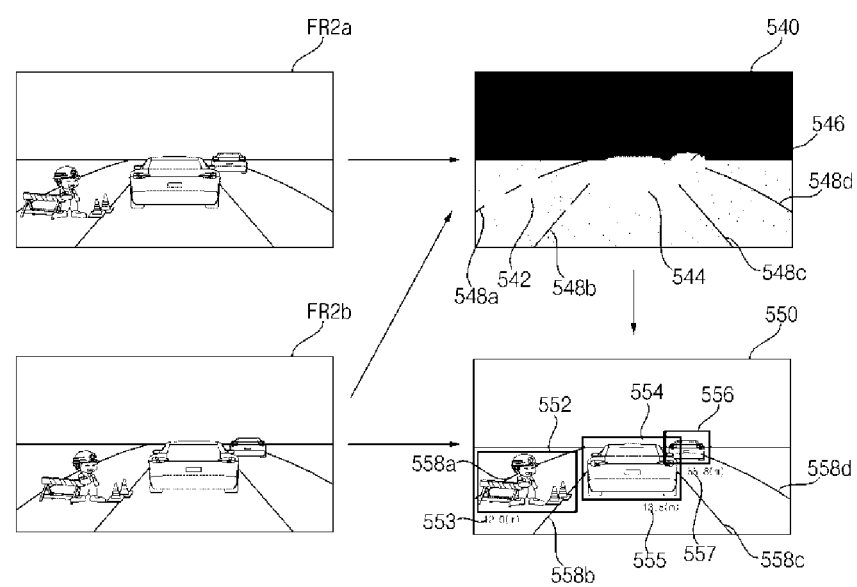

FIGS. 5A and 5B are reference views illustrating an operation of the processor 170 shown in FIG. 4A based on stereo images acquired from first and second frame periods.

Referring first to FIG. 5A, the stereo camera 195 acquires stereo images during the first frame period.

The disparity calculator 420 of the processor 170 receives stereo images FR1a and FR1b signal-processed by the image preprocessor 410 and performs stereo matching for the received stereo images FR1a and FR1b to acquire a disparity map 520.

The disparity map 520 shows a disparity between the stereo images FR1a and FR1b as levels. When a disparity level is high, the distance to the vehicle may be calculated as being short. When a disparity level is low, on the other hand, the distance to the vehicle may be calculated as being long.

Meanwhile, in a case in which the disparity map is displayed, the disparity map may be displayed with higher brightness when the disparity level is higher and the disparity map may be displayed with lower brightness when the disparity level is lower.

By way of example, FIG. 5A shows that, in the disparity map 520, first to fourth lane markers 528a, 528b, 528c, and 528d have their own disparity levels and a construction zone 522, a first preceding vehicle 524, and a second preceding vehicle 526 have their own disparity levels.

The segmentation unit 432, the object detector 434, and the object verification unit 436 respectively perform segmentation, object detection, and object verification for at least one of the stereo images FR1a or FR1b based on the disparity map 520.

By way of example, FIG. 5A shows that object detection and object verification for the second stereo image FR1b are performed using the disparity map 520. That is, object detection and object verification for first to fourth lane markers 538a, 538b, 538c, and 538d, a construction zone 532, a first preceding vehicle 534, and a second preceding vehicle 536 in an image 530 may be performed.

Referring now to FIG. 5B, the stereo camera 195 acquires stereo images during the second frame period. The disparity calculator 420 of the processor 170 receives stereo images FR2a and FR2b signal-processed by the image preprocessor 410 and performs stereo matching for the received stereo images FR2a and FR2b to acquire a disparity map 540.

In the disparity map 540, first to fourth lane markers 548a, 548b, 548c, and 548d have their own disparity levels and a construction zone 542, a first preceding vehicle 544, and a second preceding vehicle 546 have their own disparity levels.

The segmentation unit 432, the object detector 434, and the object verification unit 436 respectively perform segmentation, object detection, and object verification for at least one of the stereo images FR2a and FR2b based on the disparity map 540. The object detection and object verification for the second stereo image FR2b are performed using the disparity map 540. That is, object detection and object verification for first to fourth lane markers 558a, 558b, 558c, and 558d, a construction zone 552, a first preceding vehicle 554, and a second preceding vehicle 556 in an image 550 may be performed.

Meanwhile, the object tracking unit 440 may track the objects verified based on comparison between FIGS. 5A and 5B. Specifically, the object tracking unit 440 may track movement of the objects verified in FIGS. 5A and 5B based on motion or motion vectors of the objects. Consequently, the object tracking unit 440 may track the lane markers, the construction zone, the first preceding vehicle, and the second preceding vehicle located around the vehicle.

Figure 6A:
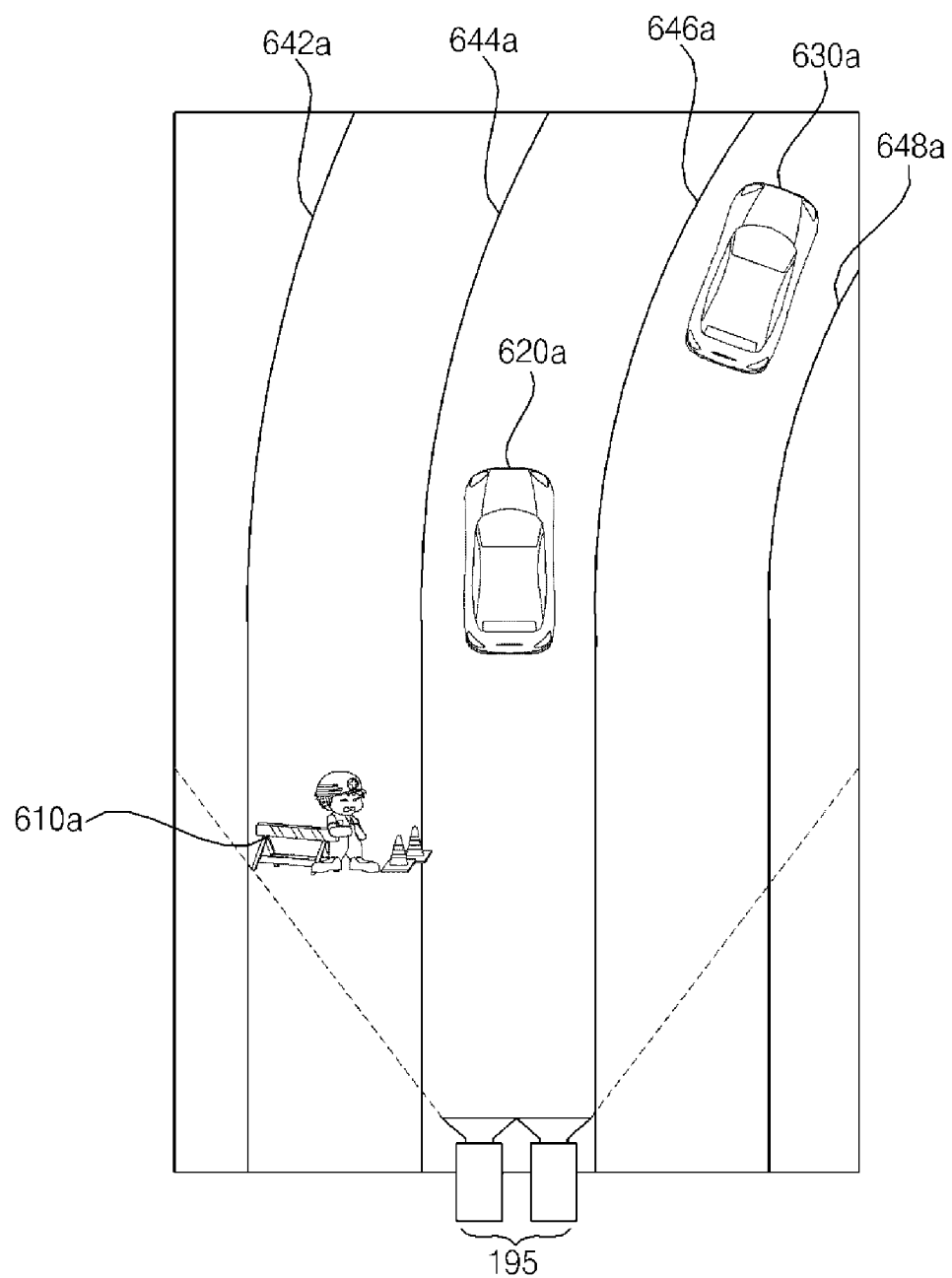
FIGS. 6A and 6B are reference views illustrating operations of the driver assistance apparatuses shown in FIGS. 3A and 3B.
Figure 6B:
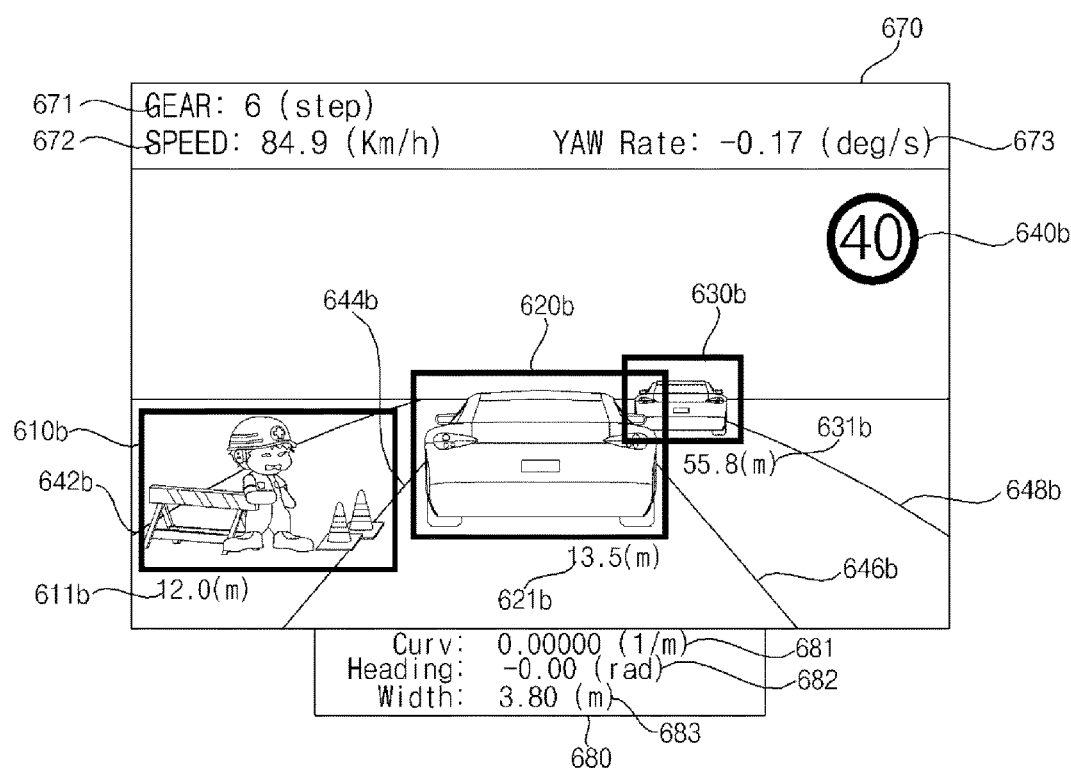

FIGS. 6A and 6B are reference views illustrating an operation of the driver assistance apparatus shown in FIG. 3.

By way of example, FIG. 6A shows a state ahead of the vehicle photographed by the stereo camera 195 provided in the vehicle. In particular, the state ahead of the vehicle may be displayed as a bird's eye view. Referring to FIG. 6A, a first lane marker 642a, a second lane marker 644a, a third lane marker 646a, and a fourth lane marker 648a are arranged from the left side to the right side. A construction zone 610a is located between the first lane marker 642a and the second lane marker 644a. A first preceding vehicle 620a is located between the second lane marker 644a and the third lane marker 646a. A second preceding vehicle 630a is located between the third lane marker 646a and the fourth lane marker 648a.

FIG. 6B is a view showing, by way of example, a state ahead of the vehicle acquired by the driver assistance apparatus together with various kinds of information. In particular, an image as shown in FIG. 6B may be displayed on the display unit 180 of the driver assistance apparatus or on the AVN apparatus 400.

By way of example, FIG. 6B shows that information is displayed based on images photographed by the stereo camera 195 unlike FIG. 6A. A first lane marker 642b, a second lane marker 644b, a third lane marker 646b, and a fourth lane marker 648b are arranged from the left side to the right side. A construction zone 610b is located between the first lane marker 642b and the second lane marker 644b. A first preceding vehicle 620b is located between the second lane marker 644b and the third lane marker 646b. A second preceding vehicle 630b is located between the third lane marker 646b and the fourth lane marker 648b.

The driver assistance apparatus 100 may perform signal processing based on stereo images photographed by the stereo camera 195 to verify objects for the construction zone 610b, the first preceding vehicle 620b, and the second preceding vehicle 630b. In addition, the driver assistance apparatus 100 may verify the first lane marker 642b, the second lane marker 644b, the third lane marker 646b, and the fourth lane marker 648b.

FIG. 6B shows, by way of example, that, in order to indicate that the objects for the construction zone 610b, the first preceding vehicle 620b, and the second preceding vehicle 630b have been verified, borders of the objects are highlighted.

On the other hand, the driver assistance apparatus 100 may calculate distance information for the construction zone 610b, the first preceding vehicle 620b, and the second preceding vehicle 630b based at least in part on stereo images photographed by the stereo camera 195.

FIG. 6B shows, by way of example, that calculated first distance information 611b, calculated second distance information 621b, and calculated third distance information 631b respectively corresponding to the construction zone 610b, the first preceding vehicle 620b, and the second preceding vehicle 630b may be displayed.

Meanwhile, the driver assistance apparatus 100 may receive sensor information for the vehicle from the ECU 770 or the sensor unit 760. In particular, the driver assistance apparatus 100 may receive and display vehicle speed information, gear information, yaw rate information indicating speed at which a rotational angle (yaw angle) of the vehicle is changed, and vehicle angle information.

FIG. 6B shows that vehicle speed information 672, gear information 671, and yaw rate information 673 may be displayed at a portion 670 above the image ahead of the vehicle and vehicle angle information 682 is displayed at a portion 680 under the image ahead of the vehicle. However, various examples may be further provided provided and fall within the scope of the present disclosure. In addition, vehicle width information 683 and road curvature information 681 may be displayed together with the vehicle angle information 682.

On the other hand, the driver assistance apparatus 100 may receive for a road on which the vehicle is traveling through the communication unit 120 or the interface unit 130. The speed limit information 640b may also be displayed.

The driver assistance apparatus 100 may display various kinds of information shown in FIG. 6B through the display unit 180. Alternatively, the driver assistance apparatus 100 may store various kinds of information without additionally displaying the information. In addition, the driver assistance apparatus 100 may utilize the information in various applications.

Figure 7:
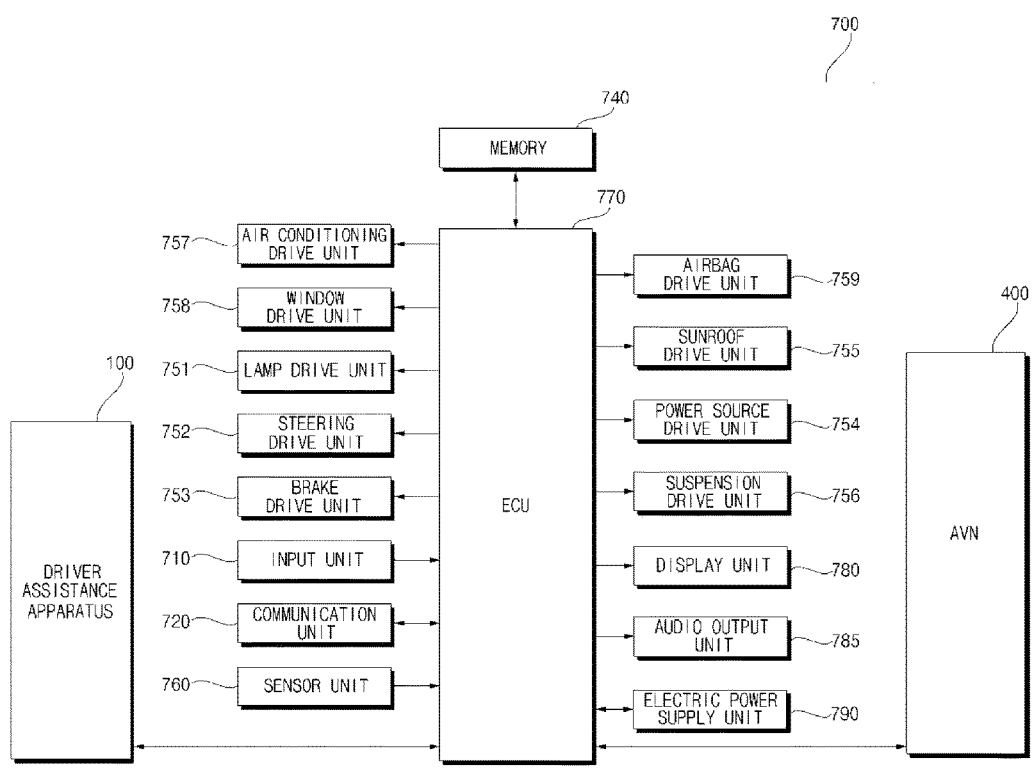
FIG. 7 is an internal block diagram showing an example of an electronic control apparatus in the vehicle shown in FIG. 1.

FIG. 7 is an internal block diagram showing an example of an electronic control apparatus in the vehicle shown in FIG. 1.

Referring to FIG. 7, the vehicle 200 may include an electronic control apparatus 700 for vehicle control. The electronic control apparatus 700 may exchange data with the driver assistance apparatus 100 and the AVN apparatus 400.

The electronic control apparatus 700 may include a user input unit 710, a communication unit 720, a memory 740, a lamp drive unit 751, a steering drive unit 752, a brake drive unit 753, a power source drive unit 754, a sunroof drive unit 755, a suspension drive unit 756, an air conditioning drive unit 757, a window drive unit 758, an airbag drive unit 759, a sensor unit 760, an ECU 770, a display unit 780, an audio output unit 785, and an electric power supply unit 790.

The input unit 710 may include a plurality of user input controls, such as a button, or a touchscreen provided in the vehicle 200. Various input operations may be performed through the user input controls or the touchscreen.

The communication unit 720 may exchange data with the mobile terminal 600 or the server 500 in a wireless fashion. In particular, the communication unit 720 may exchange data with a mobile terminal of the driver in a wireless fashion. To this end, various wireless data communication protocols, such as Bluetooth, Wi-Fi, Wi-Fi Direct, and APiX, may be used.

The communication unit 720 may receive weather information and road traffic state information, such as TPEG information, from the mobile terminal 600 or the server 500.

When a user gets into the vehicle, a mobile terminal 600 of the user may pair with the electronic control apparatus 700 automatically or by the user executing an application.

The memory 740 may store various data for overall operation of the electronic control apparatus 700, such as programs for processing or control of the ECU 770.

The lamp drive unit 751 may control turn on/turn off of lamps provided inside and outside the vehicle. In addition, the lamp drive unit 751 may control intensity, direction, and the like of light emitted from each lamp. For example, the lamp drive unit 751 may control a direction indicating lamp, a brake lamp, and the like.

The steering drive unit 752 may electronically control a steering apparatus in the vehicle 200. Consequently, the steering drive unit 752 may change a heading of the vehicle.

The brake drive unit 753 may electronically control a brake apparatus in the vehicle 200. For example, the brake drive unit 753 may control an operation of a brake mounted at each wheel to reduce speed of the vehicle 200. In another example, the brake drive unit 753 may differently control operations of brakes mounted at left wheels and right wheels to adjust the heading of the vehicle 200 to the left or the right.

The power source drive unit 754 may electronically control a power source in the vehicle 200. For example, in a case in which the power source is an engine using fossil fuel, the power source drive unit 754 may electronically control the engine. Consequently, the power source drive unit 754 may control output torque of the engine.

In another example, in a case in which the power source is an electric motor, the power source drive unit 754 may control the motor. Consequently, the power source drive unit 754 may control rotational speed and torque of the motor.

The sunroof drive unit 755 may electronically control a sunroof apparatus in the vehicle 200. For example, the sunroof drive unit 755 may control a sunroof to be opened or closed.

The suspension drive unit 756 may electronically control a suspension apparatus in the vehicle 200. For example, in a case in which a road surface is uneven, the suspension drive unit 756 may control the suspension apparatus to reduce vibration of the vehicle 200.

The air conditioning drive unit 757 may electronically control an air conditioner in the vehicle 200. For example, in a case in which the internal temperature of the vehicle is high, the air conditioning drive unit 757 may control the air conditioner to supply cool air into the vehicle.

The window drive unit 758 may electronically control a window apparatus in the vehicle 200. For example, the window drive unit 758 may control left and right side windows of the vehicle to be opened or closed.

The airbag drive unit 759 may electronically control an airbag apparatus in the vehicle 200. For example, the airbag drive unit 759 may control an airbag to deploy in a dangerous situation.

The sensor unit 760 senses a signal related to travel of the vehicle 200. To this end, the sensor unit 760 may include a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, an in-vehicle humidity sensor, or another appropriate type of sensor.

Consequently, the sensor unit 760 may acquire a sensing signal for vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, in-vehicle humidity information, and the like.

In addition, the sensor unit 760 may further include an engine speed sensor, an air flow sensor (AFS), an intake air temperature sensor (ATS), a water temperature sensor (WTS), a throttle position sensor (TPS), a top dead center (TDC) sensor, and a crank angle sensor (CAS). The ECU 770 may control overall operation of each unit in the electronic control apparatus 700. The ECU 770 may perform a specific operation based on an input through the input unit 710, receive and transmit a signal sensed by the sensor unit 760 to the driver assistance apparatus 100, receive map information from the AVN apparatus 400, or control operations of the respective drive units 751, 752, 753, 754, and 756.

In addition, the ECU 770 may receive weather information and road traffic state information, such as TPEG information, from the communication unit 720.

The display unit 780 may display an image related to an operation of the driver assistance apparatus. In order to display such an image, the display unit 780 may include a cluster or an HUD provided at the inside front of the vehicle. In a case in which the display unit 180 is the HUD, the display unit 180 may include a projection module to project an image on the front windshield glass of the vehicle 200. Meanwhile, the display unit 780 may include a touchscreen to allow user input by tapping on the screen.

The audio output unit 785 converts an electric signal received from the ECU 770 into an audio signal and outputs the audio signal. To this end, the audio output unit 785 may include a speaker. The audio output unit 785 may output a sound corresponding to an operation of the input unit 710, e.g. a button.

The electric power supply unit 790 may supply electric power to the respective components under control of the ECU 770. In particular, electric power from an in-vehicle battery (not shown) may be supplied to the electric power supply unit 790.

Figure 8:
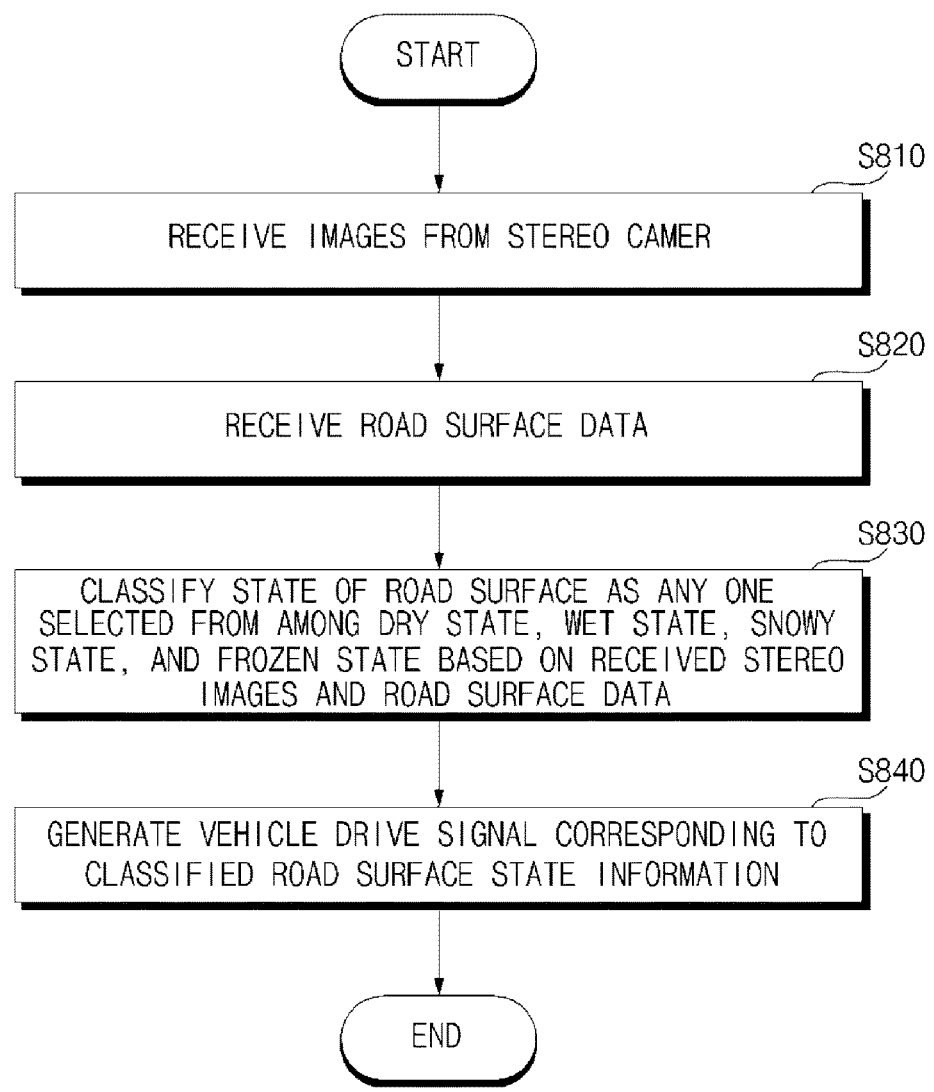
FIG. 8 is a flowchart showing an operation method of the driver assistance apparatus according to the embodiment of the present disclosure.

FIG. 8 is a flowchart showing an operation method of the driver assistance apparatus according to the embodiment of the present disclosure and FIGS. 9 to 18 are reference views illustrating the operation method of the driver assistance apparatus shown in FIG. 8.

Referring first to FIG. 8, the processor 170 of the driver assistance apparatus 100 receives stereo images from the stereo camera 195 (S810). As previously described with reference to FIG. 2, the processor 170 of the driver assistance apparatus 100 receives a first image through the first camera 195*a* of the stereo camera 195 disposed in the vehicle and a second image through the second camera 195*b* of the stereo camera 195.

Since the first camera 195*a* and the second camera 195*b* are spaced apart from each other, a disparity occurs between the first image and the second image.

The processor 170 of the driver assistance apparatus 100 may calculate the disparity between the first image and the second image and perform segmentation, object detection, and object verification for at least one of the first and second images using the calculated disparity information.

In addition, the processor 170 of the driver assistance apparatus 100 may track the verified object, such as a preceding vehicle, a lane marker, or a road surface.

In particular, the processor 170 of the driver assistance apparatus 100 may detect, verify, and track the road surface in connection with the present disclosure.

Subsequently, the processor 170 of the driver assistance apparatus 100 receives road surface data (S820).

The road surface data may be road surface data classified as a dry state, a wet state, a snow covered state, and an icy state, which are stored in the memory 140.

Alternatively, the road surface data may be road surface data classified as the dry state, the wet state, the snow covered state, and the icy state, which are received from the mobile terminal 600 or the server 500 through the communication unit 120.

The road surface data may include data based on stereo images received from the stereo camera 195. The road surface data may be classified based on detection, verification, and tracking of the road surface.

In order to classify the road surface data into the dry state, the wet state, the snow covered state, and the icy state, the processor 170 of the driver assistance apparatus 100 may use brightness data/levels in the stereo images.

For example, the processor 170 of the driver assistance apparatus 100 may classify the road surface data into the dry state, the wet state, the snow covered state, and the icy state based on differences in brightness data of the stereo images. Specifically, the dry state may have the highest brightness level and the wet state, the snow covered state, and the icy state may have sequentially lower brightness levels. As described above, therefore, the road surface data may be classified into the dry state, the wet state, the snow covered state, and the icy state based on the brightness.

In another example, the processor 170 of the driver assistance apparatus 100 may classify the road surface data into the dry state, the wet state, the snow covered state, and the icy state based on differences in frequency spectra acquired through frequency conversion of the stereo images. Specifically, the dry state may have a frequency spectrum or histogram with the widest bandwidth and the wet state, the snow covered state, and the icy state may have frequency spectra or histogram with sequentially narrower bandwidths. Alternatively, the dry state may have the highest frequency gain and the wet state, the snow covered state, and the icy state may have sequentially lower frequency gains. As described above, therefore, the road surface data may be classified into the dry state, the wet state, the snow covered state, and the icy state based on at least one of the bandwidth of the frequency spectrum and the frequency gain.

Subsequently, the processor 170 of the driver assistance apparatus 100 may classify the state of the road surface as any one of the dry state, the wet state, the snow covered state, and the icy state based on the received stereo images and the received road surface data (S830).

The processor 170 of the driver assistance apparatus 100 may calculate a disparity between the stereo images, detect a road surface in the stereo images based on the disparity information between the stereo images, and classify the state of the road surface as any one of the dry state, the wet state, the snow covered state, and the icy state based on data related to the detected road surface and the road surface data stored in the memory 140.

To this end, the processor 170 of the driver assistance apparatus 100 may include a road surface pattern detection unit 935 to classify the state of the road surface as any one of the dry state, the wet state, the snow covered state, and the icy state based on the data related to the road surface in the stereo images and the road surface data stored in the memory 140.

Meanwhile, the processor 170 of the driver assistance apparatus 100 may classify the state of the road surface as any one of the dry state, the wet state, the snow covered state, and the icy state based on brightness data of the data related to the road surface in the stereo images and the road surface data stored in the memory 140.

On the other hand, the processor 170 of the driver assistance apparatus 100 may classify the state of the road surface as any one of the dry state, the wet state, the snow covered state, and the icy state based on frequency spectra of the data related to the road surface in the stereo images and the road surface data stored in the memory 140.

Meanwhile, the road surface data stored in the memory 140 may be image data having position and time information.

Consequently, the processor 170 of the driver assistance apparatus 100 may compare the stereo images photographed in real time by the stereo camera 195 with the image data having position and time information stored in the memory 140 and classify the state of the road surface as any one of the dry state, the wet state, the snow covered state, and the icy state based on the comparison.

Subsequently, the processor 170 of the driver assistance apparatus 100 may generate a vehicle drive signal corresponding to the classified road surface state information (S840).

The vehicle drive signal may include at least one of a brake drive signal to drive the brake apparatus and a steering drive signal to drive the steering apparatus.

That is, the processor 170 of the driver assistance apparatus 100 may generate and output at least one of the brake drive signal and the steering drive signal corresponding to the classified road surface state information.

For example, in a case in which a user has a habit or pattern of driving the brake apparatus at a level of 3, the processor 170 may output a brake operation weighting signal to the brake drive unit 753 according to the road surface state.

For example, in a case in which the road surface is in the dry state, no weighting signal may be output. In a case in which the road surface is in the wet state, a weighting signal having a level of 0.2 may be output. In a case in which the road surface is in the snow covered state, a weighting signal having a level of 0.5 may be output. In a case in which the road surface is in the icy state, a weighting signal having a level of 0.8 may be output.

Although the user drives the brake apparatus at a level of 3, therefore, the brake apparatus may be actually operated at a level of 3, 3.2, 3.5, and 3.8 in a case in which the road surface is in the dry state, the wet state, the snow covered state, and the icy state, respectively. As a result, safety during driving of the vehicle may be increased while user convenience is also improved.

In a similar manner, the processor 170 may output a steering operation adding signal to the steering drive unit 752 according to the road surface state.

For example, in a case in which the road surface is in the dry state, no adding signal may be output. In a case in which the road surface is in the wet state, a weighting signal having a level of $-\Delta 0.2$ based on a level of 1 may be output. In a case in which the road surface is in the snow covered state, a weighting signal having a level of $-\Delta 0.3$ may be output. In a case in which the road surface is in the icy state, a weighting signal having a level of $-\Delta 0.4$ may be output.

As the road surface becomes slipperier, i.e., the road surface state is changed from the dry state to the icy state, therefore, the level of the steering operation adding signal is decreased. As a result, it is possible to prevent slip based on operation of the steering apparatus.

Figure 9:
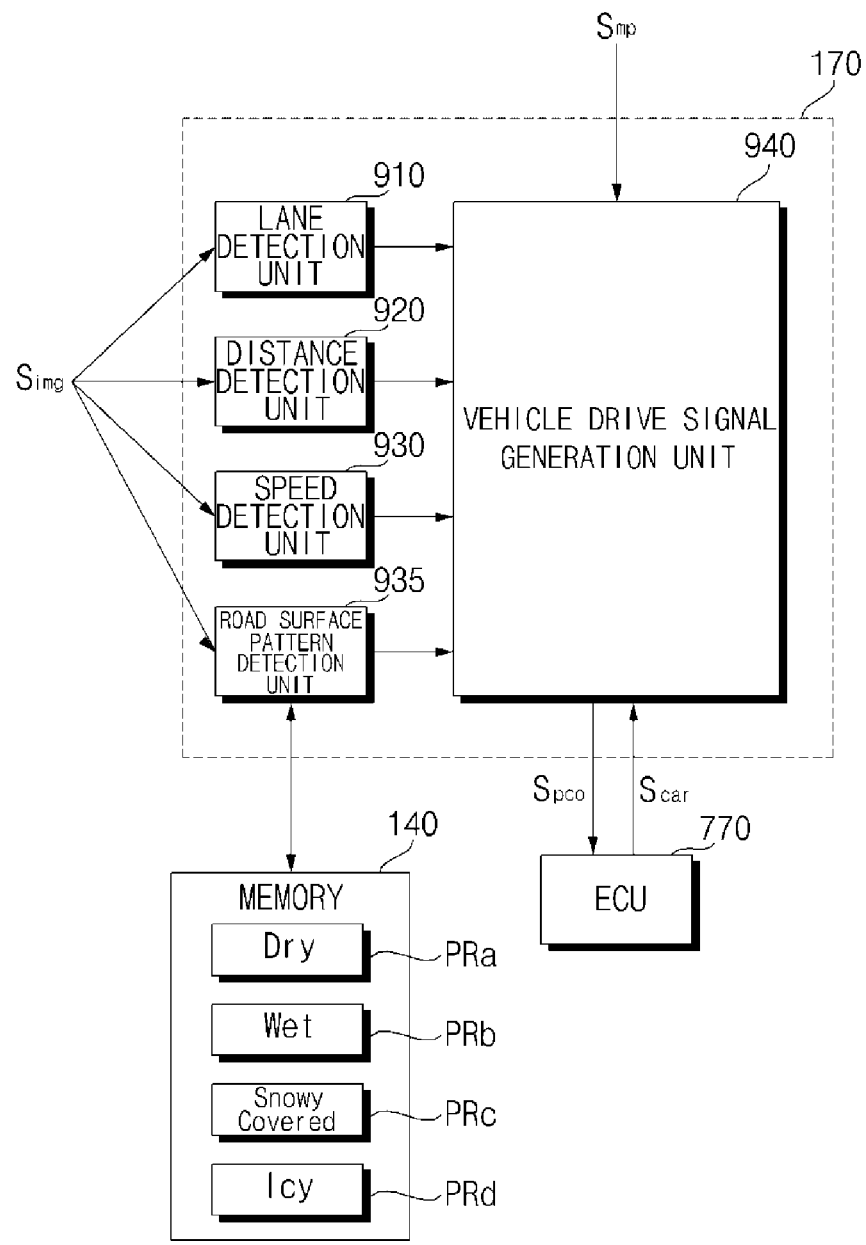
FIGS. 9 to 18 are reference views illustrating the operation method of the driver assistance apparatus shown in FIG. 8.

FIG. 9 is a schematic internal block diagram of the processor in connection with the operation method of FIG. 8.

Referring to FIG. 9, the processor 170 of the driver assistance apparatus 100 may include a lane marker detection unit 910, a distance detection unit 920, a speed detection unit 930, a road surface pattern detection unit 935, and a vehicle drive signal generation unit 940.

The processor 170 of the driver assistance apparatus 100 may receive map information Smp, receive stereo images Sim from the stereo camera 195, and receive vehicle travel information Scar from the ECU 770 or the sensor unit 760.

The map information Smp may be received from the AVN apparatus 400 through the interface unit 130 or from the memory 140.

The vehicle travel information Scar may include vehicle heading information, vehicle position information (GPS information), vehicle angle information, vehicle speed information, vehicle tilt information, lateral entrance information, and backward movement information. Meanwhile, the vehicle travel information Scar may be a portion of the sensor information.

The lane marker detection unit 910 may perform lane marker detection based on the stereo images from the stereo camera 195. In particular, the lane marker detection unit 910 may detect a lane marker based on a disparity between the stereo images.

In a similar manner, the distance detection unit 920 and the speed detection unit 930 may detect the distance and speed of a preceding vehicle, the distance and speed of a vehicle following on the right, and the distance and speed of a vehicle following on the left based on the stereo images from the stereo camera 195.

The road surface pattern detection unit 935 may detect a road surface in the stereo images and classify the state of the road surface as any one of the dry state, the wet state, the snow covered state, and the icy state based on data related to the detected road surface and the road surface data stored in the memory 140.

Meanwhile, the road surface pattern detection unit 935 may classify the state of the road surface as any one of the dry state, the wet state, the snow covered state, and the icy state based on brightness data of the data related to the road surface in the stereo images and the road surface data stored in the memory 140.

On the other hand, the road surface pattern detection unit 935 may classify the state of the road surface as any one of the dry state, the wet state, the snow covered state, and the icy state based on frequency spectra of the data related to the road surface in the stereo images and the road surface data stored in the memory 140.

In addition, the road surface pattern detection unit 935 may classify the state of the road surface as any one of the dry state, the wet state, the snow covered state, and the icy state based on brightness data and frequency spectra of the data related to the road surface in the stereo images and the road surface data stored in the memory 140.

The vehicle drive signal generation unit 940 may generate a vehicle drive signal Spco corresponding to the detected road surface pattern.

That is, the vehicle drive signal generation unit 940 may generate and output at least one of a brake drive signal and a steering drive signal corresponding to the classified road surface state information.

For example, the processor 170 may output a brake operation weighting signal to the brake drive unit 753 according to the road surface state.

In another example, the processor 170 may output a steering operation adding signal to the steering drive unit 752 according to the road surface state.

The output vehicle drive signal Spco may be directly input to the steering drive unit 752 or the brake drive unit 753. Alternatively, the output vehicle drive signal Spco may be input to the steering drive unit 752 or the brake drive unit 753 via the ECU 770. Consequently, it is possible to perform travel of the vehicle corresponding to the detected road surface.

Figure 10:
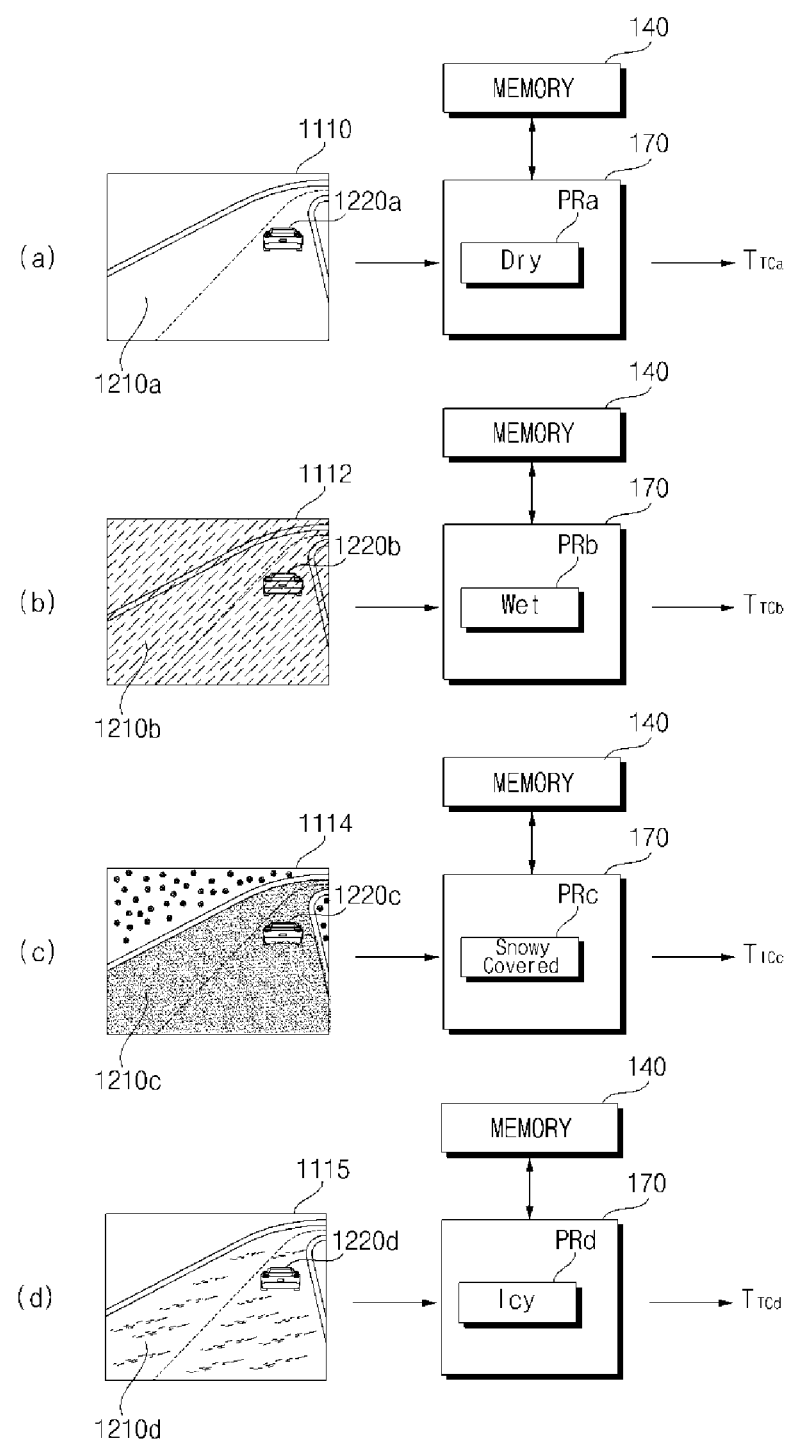
Figure 11:
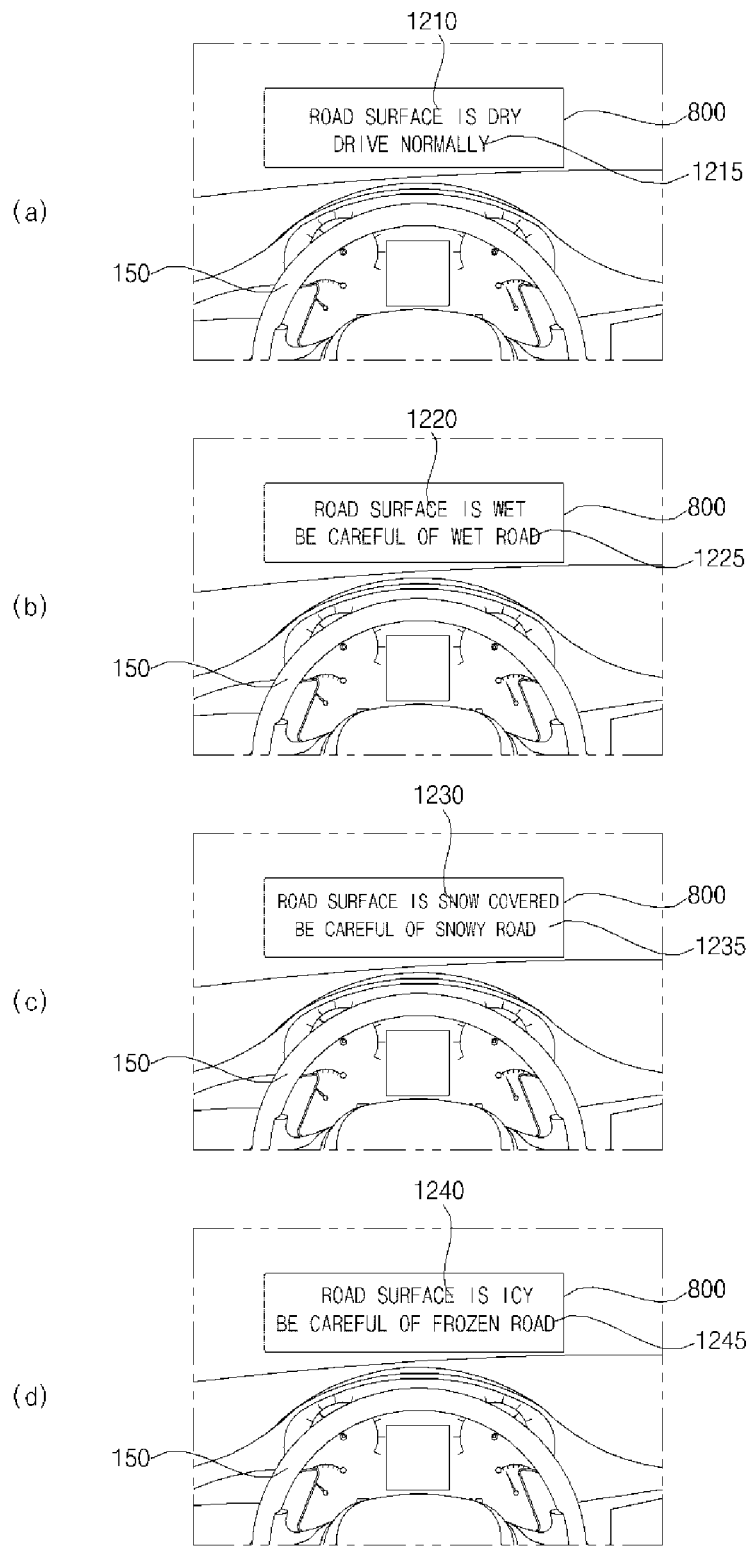
Figure 12A:
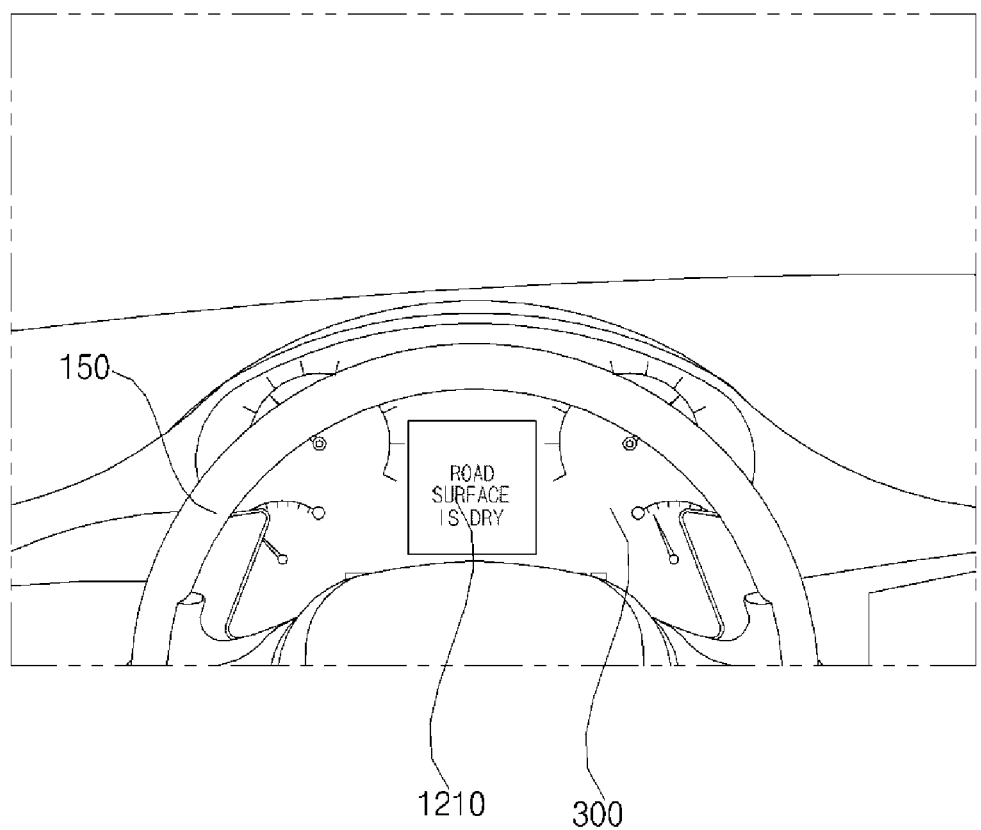
Figure 12B:
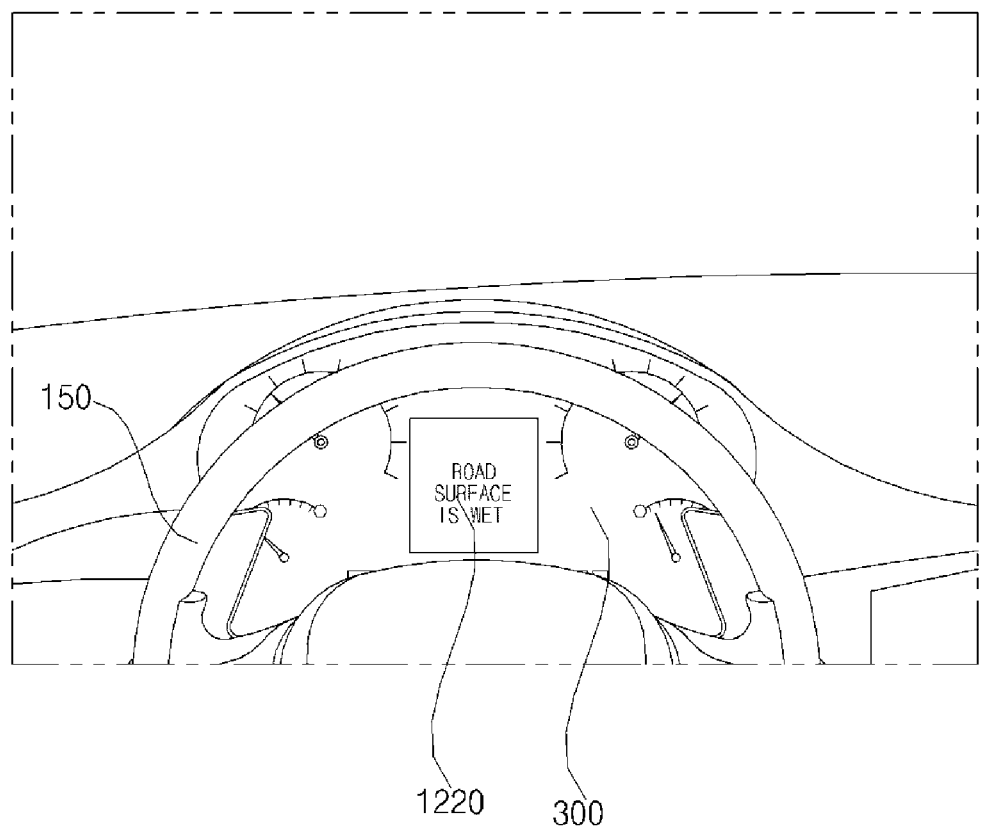
Figure 12C:
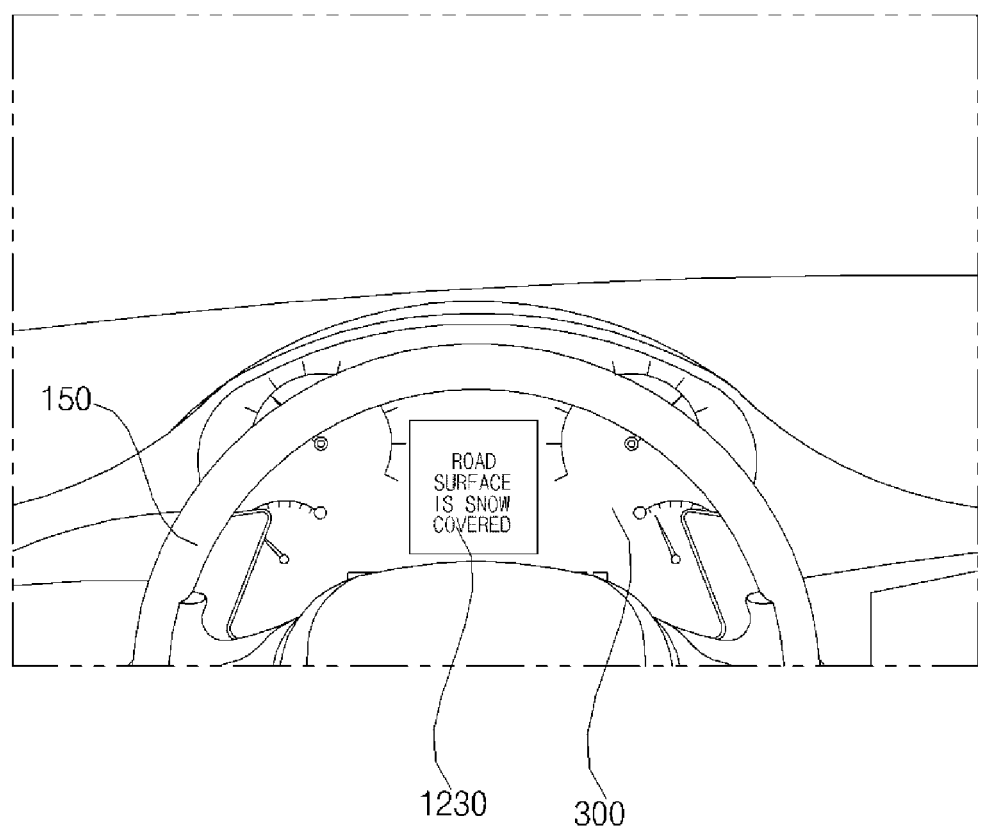
Figure 12D:
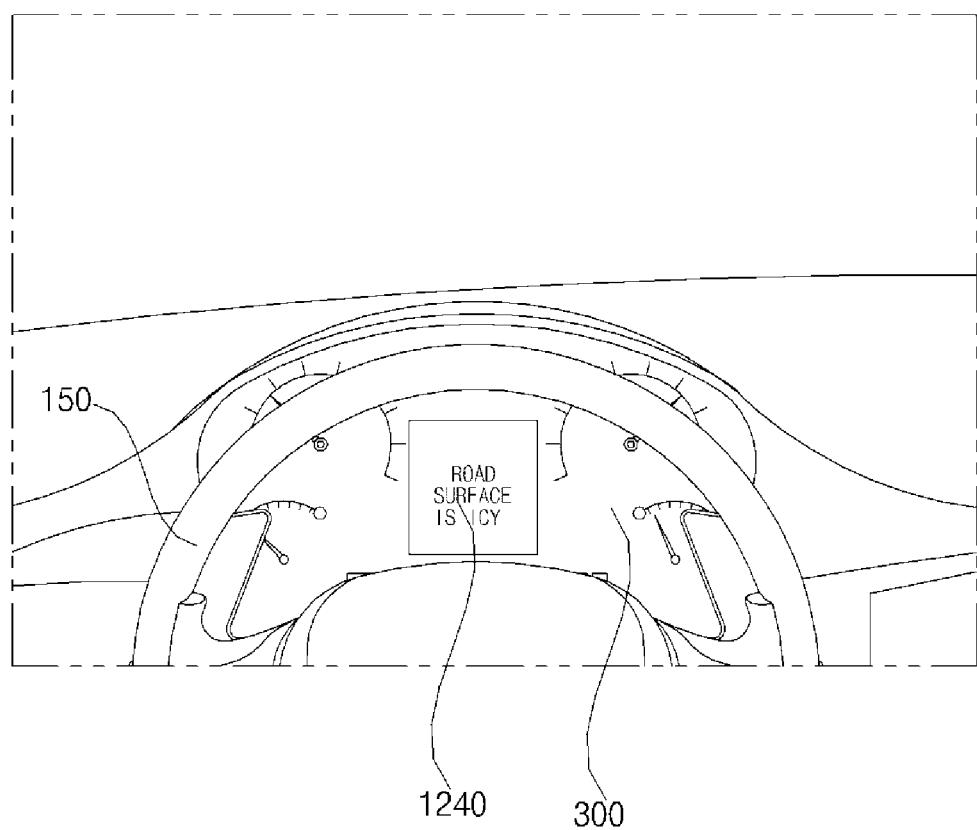

FIG. 10 is a reference view illustrating a road surface state detection operation performed by the processor 170 and FIGS. 11 to 12D are views showing, by way of example, that various kinds of information based on road surface detection are displayed.

FIG. 10(*a*) shows, by way of example, that an image 1110 containing a dry road surface 1210*a* and a preceding vehicle 1220*a* is input to the processor 170, dry state information PRa is generated based on the road surface data stored in the memory 140, and a signal TTCa indicating the dry state information PRa is output in response thereto.

In a case in which the display unit 180 is an HUD, a message 1210 indicating "road surface is dry" and a driving guidance message 1215 of "drive normally" corresponding to the road surface state may be output to an output region 800 on the front windshield glass of the vehicle according to the signal TTCa as shown in FIG. 11(*a*). As a result, user convenience may be improved.

On the other hand, in a case in which the display unit 180 is a cluster 300, the message 1210 indicating "road surface is dry" may be output to the cluster 300 as shown in FIG. 12A. In addition, the driving guidance message 1215 as shown in FIG. 11(*a*) may be output to the cluster 300. As a result, user convenience may be improved.

FIG. 10(*b*) shows, by way of example, that an image 1112 containing a wet road surface 1210*b* and a preceding vehicle 1220*b* is input to the processor 170, wet state information PRb is generated based on the road surface data stored in the memory 140, and a signal TTCb indicating the wet state information PRb is output in response thereto.

In a case in which the display unit 180 is the HUD, a message 1220 indicating "road surface is wet" and a driving guidance message 1225 of "be careful of wet road" corresponding to the road surface state may be output to the output region 800 on the front windshield glass of the vehicle according to the signal TTCb as shown in FIG. 11(*b*). As a result, user convenience may be improved.

On the other hand, in a case in which the display unit 180 is the cluster 300, the message 1220 indicating "road surface is wet" may be output to the cluster 300 as shown in FIG. 12B. In addition, the driving guidance message 1225 as shown in FIG. 11(*b*) may be output to the cluster 300. As a result, user convenience may be improved.

FIG. 10(*c*) shows, by way of example, that an image 1114 containing a snow covered road surface 1210*c* and a preceding vehicle 1220*c* is input to the processor 170, snow covered state information PRc is generated based on the road surface data stored in the memory 140, and a signal TTCc indicating the snow covered state information PRc is output in response thereto.

In a case in which the display unit 180 is the HUD, a message 1230 indicating "road surface is snow covered" and a driving guidance message 1235 of "be careful of snow covered road" corresponding to the road surface state may be output to the output region 800 on the front windshield glass of the vehicle according to the signal TTCc as shown in FIG. 11(*c*). As a result, user convenience may be improved.

On the other hand, in a case in which the display unit 180 is the cluster 300, the message 1230 indicating "road surface is snow covered" may be output to the cluster 300 as shown in FIG. 12C. In addition, the driving guidance message 1235 as shown in FIG. 11(*c*) may be output to the cluster 300. As a result, user convenience may be improved.

FIG. 10(*d*) shows, by way of example, that an image 1115 containing an icy road surface 1210*d* and a preceding vehicle 1220*d* is input to the processor 170, icy state information PRd is generated based on the road surface data stored in the memory 140, and a signal TTCd indicating the icy state information PRd is output in response thereto.

In a case in which the display unit 180 is the HUD, a message 1240 indicating "road surface is icy" and a driving guidance message 1245 of "be careful of icy road" corresponding to the road surface state may be output to the output region 800 on the front windshield glass of the vehicle according to the signal TTCd as shown in FIG. 11(*d*). As a result, user convenience may be improved.

On the other hand, in a case in which the display unit 180 is the cluster 300, the message 1240 indicating "road surface is icy" may be output to the cluster 300 as shown in FIG. 12D. In addition, the driving guidance message 1245 as shown in FIG. 11(*d*) may be output to the cluster 300. As a result, user convenience may be improved.

Meanwhile, the various messages shown in FIGS. 11 to 12D may be output through the audio output unit 185 instead of the display unit 180. Of course, the various messages may also be output through both the display unit 180 and the audio output unit 185.

As the road surface state is recognized in real time based on the actually photographed image and relevant information is provided as described above, user convenience is improved. Particularly, in this case, it is possible to achieve higher accuracy and rapidity than in a case in which road surface state information is received from the outside.

Figure 13:
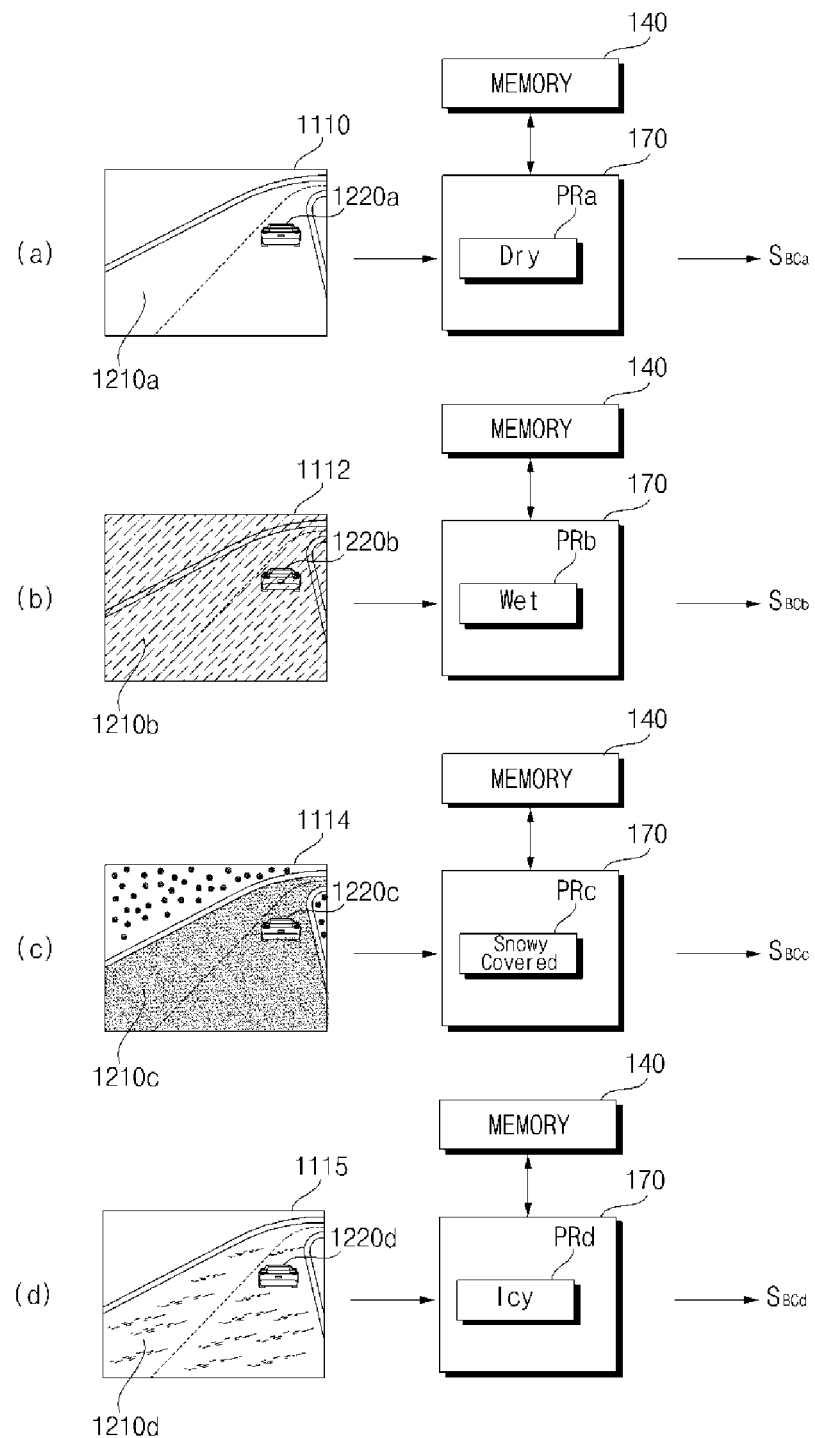
Figure 14:
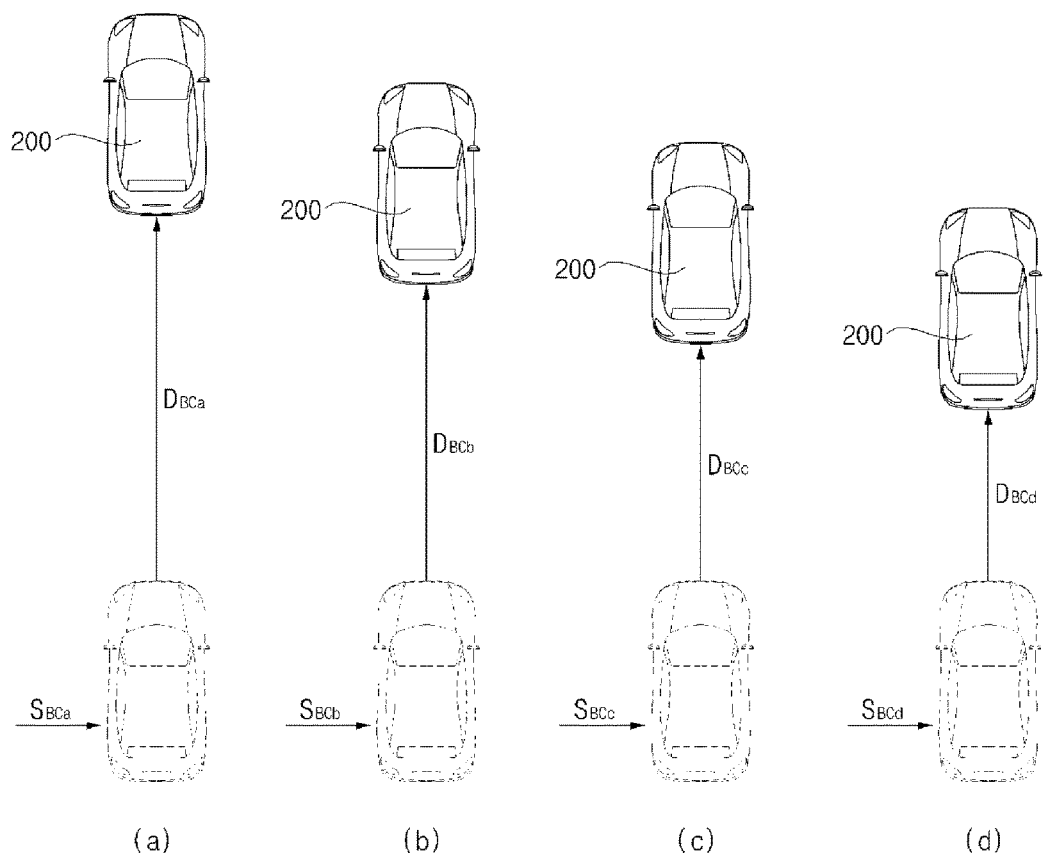

By way of example, FIG. 13 shows that the processor 170 detects a road surface state and outputs a brake operation signal based thereon and FIG. 14 shows a brake operation according to the brake operation signal.

FIG. 13 is similar to FIG. 10 and, therefore, only the differences therebetween will hereinafter be described. The processor 170 may generate brake operation signals SBCa, SBCb, SBCc, and SBCd based on various kinds of detected road surface state information PRa, PRb, PRc, PRd.

Each of the brake operation signals SBCa, SBCb, SBCc, and SBCd may include the above-mentioned brake operation weighting signal.

That is, in a case in which the first brake operation signal SBCa corresponding to the dry road surface has a level of 3, the second brake operation signal SBCb corresponding to the wet road surface may have a level of 3.2, the third brake operation signal SBCc corresponding to the snow covered road surface may have a level of 3.5, and the fourth brake operation signal SBCd corresponding to the dry road surface may have a level of 3.8.

FIG. 14 shows, by way of example, braking distances of the vehicle 200 according to the respective brake operation signals SBCa, SBCb, SBCc, and SBCd. In a state in which the road surface is dry, a braking distance DBCa according to the first brake operation signal SBCa is the longest and a braking distance DBCd according to the fourth brake operation signal SBCd is the shortest.

As described above, therefore, stability during travel of the vehicle is improved according to the brake operation signals corresponding to the road surface states.

Figure 15:
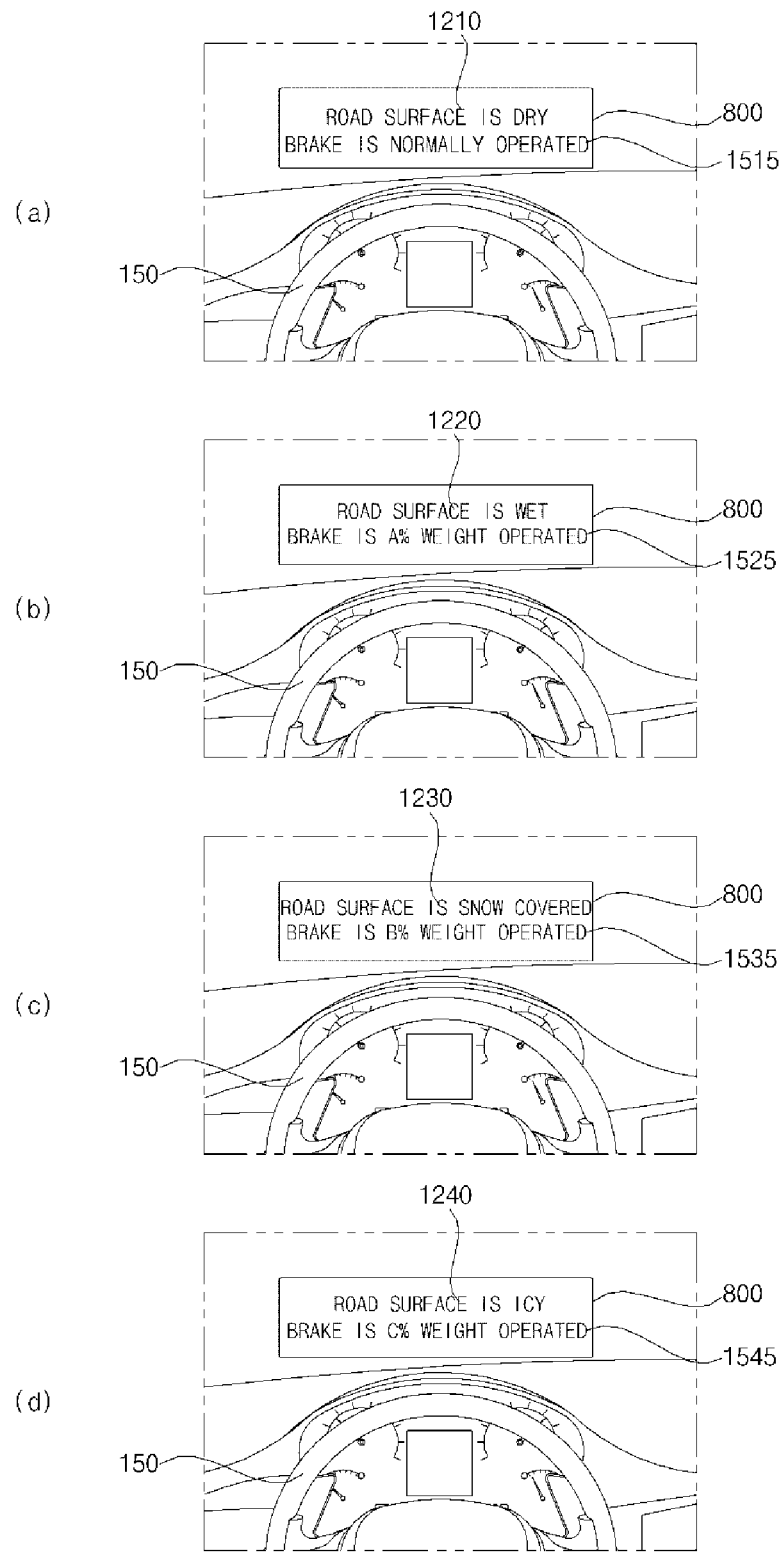

By way of example, FIG. 15 shows that information corresponding to various brake operation signals is displayed.

In a case in which the display unit 180 is an HUD, for example, a message 1210 indicating "road surface is dry" and brake operation state information 1515 indicating "brake is normally operated" may be output to the output region 800 on the front windshield glass of the vehicle according to the first brake operation signal SBCa as shown in FIG. 15(a). As a result, user convenience may be improved.

In another example, a message 1220 indicating "road surface is wet" and brake operation state information 1525 indicating "brake is A % weight operated" may be output according to the second brake operation signal SBCb as shown in FIG. 15(b). As a result, user convenience may be improved.

In another example, a message 1230 indicating "road surface is snow covered" and brake operation state information 1535 indicating "brake is B % weight operated" may be output according to the third brake operation signal SBCc as shown in FIG. 15(c). As a result, user convenience may be improved.

In a further example, a message 1240 indicating "road surface is icy" and brake operation state information 1545 indicating "brake is C % weight operated" may be output according to the fourth brake operation signal SBCd as shown in FIG. 15(d). As a result, user convenience may be improved.

Figure 16:
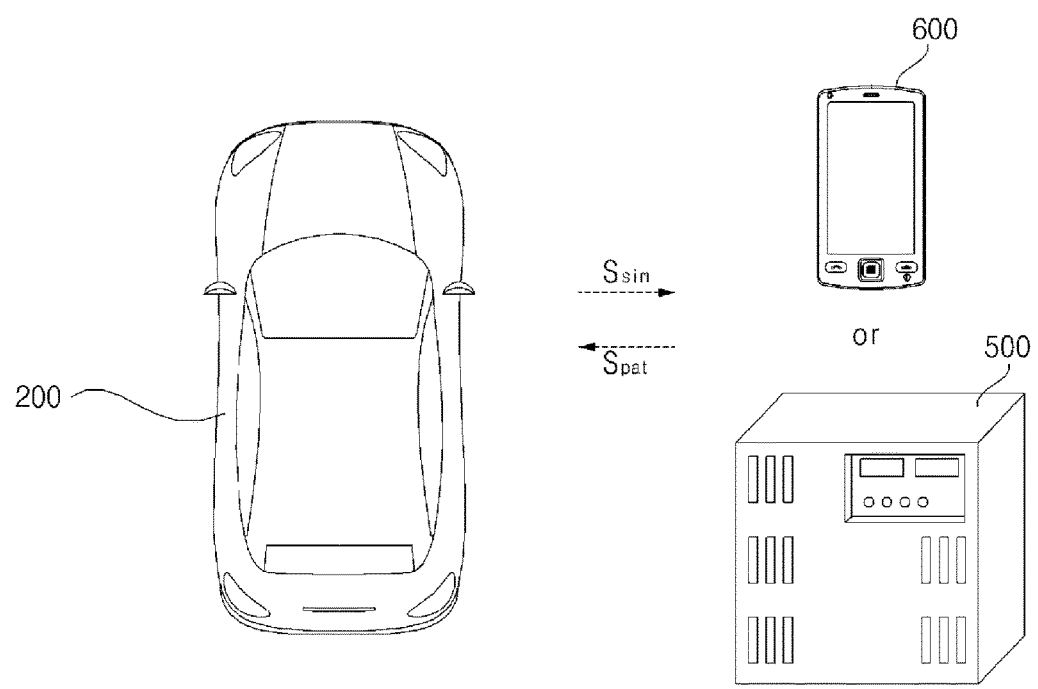

FIG. 16 shows an example of data transmission between the vehicle and the server or the mobile terminal. The processor 170 in the vehicle 200 may transmit image data Ssim to the mobile terminal 600 or the server 500 through the communication unit 120 and receive road surface data Spat classified into a dry state, a wet state, a snow covered state, and an icy state from the mobile terminal 600 or the server 500.

The image data Ssim received by the mobile terminal 600 or the server 500 may be image data having position and time information.

Meanwhile, the mobile terminal 600 or the server 500 may receive image data having position and time information from a plurality of vehicles. In addition, the mobile terminal 600 or the server 500 may classify the state of the road surface into the dry state, the wet state, the snow covered state, and the icy state through the learning or the training of continuously received image data.

In particular, the mobile terminal 600 or the server 500 may sort the image data based on the position and time information and classify the state of the road surface as any one of the dry state, the wet state, the snow covered state, and the icy state through learning or training of a plurality of images corresponding to the position and time information.

In addition, the mobile terminal 600 or the server 500 may transmit the road surface data Spat classified as described above to the vehicle 200. Consequently, the processor 170 in the vehicle 200 may receive the road surface data Spat classified into the dry state, the wet state, the snow covered state, and the icy state based on the position and time information.

The memory 140 may store the road surface data Spat classified into the dry state, the wet state, the snow covered state, and the icy state received from the mobile terminal 600 or the server 500 to update the previous road surface data.

The processor 170 may classify the state of the road surface on which the vehicle is traveling as any one of the dry state, the wet state, the snow covered state, and the icy state based on the stereo images and the updated road surface data Spat.

The processor 170 may generate a vehicle drive signal or various kinds of information to display road surface data using the classified road surface data Spat.

In addition, the processor 170 may generate and output at least one of a brake drive signal and a steering drive signal corresponding to the classified road surface state information.

Figure 17:
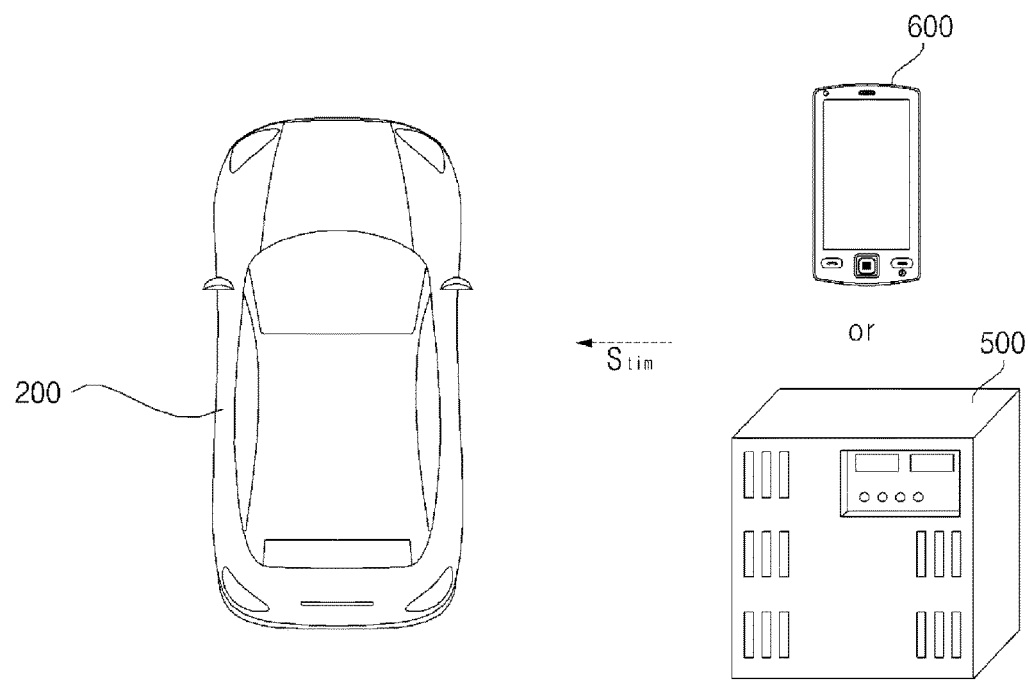

FIG. 17 shows another example of data transmission between the vehicle and the server or the mobile terminal. The processor 170 in the vehicle 200 may receive information Stim including at least one of time information, season information, and weather information from the mobile terminal 600 or the server 500 through the communication unit 120.

The processor 170 in the vehicle 200 may use the received information Stim when classifying a road surface pattern.

Specifically, the processor 170 may classify the state of the road surface as any one of the dry state, the wet state, the snow covered state, and the icy state based on at least one of the time information, the season information, and the weather information, the stereo images received from the stereo camera 195, and the road surface data.

For example, upon receiving weather information indicating a rainy day, the processor 170 in the vehicle 200 may determine whether the state of the road surface is any one of the wet state, the snow covered state, and the icy state excluding the dry state.

In another example, upon receiving weather information indicating a sub-zero temperature (centigrade) day, the processor 170 in the vehicle 200 may determine whether the state of the road surface is any one of, the dry state, the snow covered state, and the icy state excluding the wet state.

In a further example, the processor 170 in the vehicle 200 may retrieve image data corresponding to the received time information, season information, and weather information from various image data stored in the memory 140 and classify the state of the road surface as any one of the dry state, the wet state, the snow covered state, and the icy state based on the retrieved image data.

Figure 18:
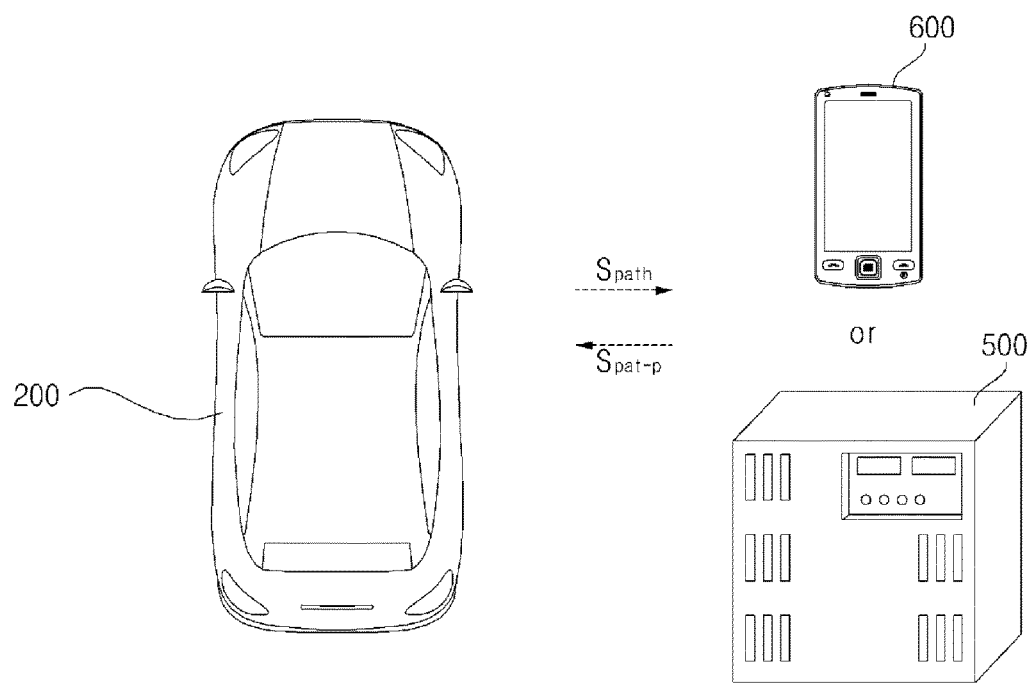

FIG. 18 shows a further example of data transmission between the vehicle and the server or the mobile terminal.

Referring to FIG. 18, the processor 170 in the vehicle 200 may transmit path information Spath including a current vehicle travel path or an expected vehicle travel path to the mobile terminal 600 or the server 500 through the communication unit 120 and receive road surface data Spat-p classified into a dry state, a wet state, a snow covered state, and an icy state corresponding to the path information Spath including the current vehicle travel path or the expected vehicle travel path from the mobile terminal 600 or the server 500.

The mobile terminal 600 or the server 500 may receive path information and relevant image data from a plurality of vehicles. In addition, the mobile terminal 600 or the server 500 may classify the state of the road surface corresponding to the path information of the vehicle 200 as any one of the dry state, the wet state, the snow covered state, and the icy state based on the path information and the relevant image data received from the vehicles.

In particular, the mobile terminal 600 or the server 500 may sort the image data based on the path information and classify the state of the road surface into the dry state, the wet state, the snow covered state, and the icy state through learning or training of a plurality of images corresponding to the path information.

In addition, the mobile terminal 600 or the server 500 may transmit the road surface data Spat-p classified as described above to the vehicle 200. Consequently, the processor 170 in the vehicle 200 may receive the road surface data Spat-p classified into the dry state, the wet state, the snow covered state, and the icy state based on the path information.

The memory 140 may store the road surface data Spat-p classified into the dry state, the wet state, the snow covered state, and the icy state received from the mobile terminal 600 or the server 500 to update the previous road surface data.

The processor 170 may classify the state of the road surface on which the vehicle is traveling as any one of the dry state, the wet state, the snow covered state, and the icy state based on the stereo images and the updated road surface data Spat-p.

The processor 170 may generate a vehicle drive signal or various kinds of information to display road surface data using the classified road surface data Spat-p.

In addition, the processor 170 may generate and output at least one of a brake drive signal and a steering drive signal corresponding to the current vehicle travel path or the expected vehicle travel path and the classified road surface state information.

The driver assistance apparatus according to the embodiment of the present disclosure and the vehicle including the same are not limited to the constructions and methods of the exemplary embodiments set forth herein. The exemplary embodiments may be selectively combined in part or in whole to form various embodiments.

Meanwhile, the operation method of the driver assistance apparatus or the vehicle according to the present disclosure may be implemented as code that can be written on a processor-readable recording medium and thus read by a processor provided in the driver assistance apparatus or the vehicle. The processor-readable recording medium may be any type of recording device in which data is stored in a processor-readable manner. The processor-readable recording medium may include, for example, a read only memory (ROM), a random access memory (RAM), a compact disc read only memory (CD-ROM), a magnetic tape, a floppy disc, and an optical data storage device and may be implemented in the form of a carrier wave transmitted over the Internet. The processor-readable recording medium can be distributed over a plurality of computer systems connected to a network such that processor-readable code is written thereto and executed therefrom in a decentralized manner.

As is apparent from the above description, in a driver assistance apparatus according to an embodiment of the present disclosure and a vehicle including the same, it is possible to classify a state of a road surface as any one of a dry state, a wet state, a snow covered state, and an icy state based on stereo images received from a stereo camera and road surface data stored in a memory while being classified into the dry state, the wet state, the snow covered state, and the icy state, whereby it is possible to recognize the state of the road surface.

Meanwhile, a communication unit transmits the stereo images from the stereo camera to a mobile terminal or a server and receives the road surface data regarding the state of the road surface classified into the dry state, the wet state, the snow covered state, and the icy state from the mobile terminal or the server. Consequently, it is possible to recognize the state of the road surface.

In addition, the communication unit receives at least one of time information, season information, and weather information from the mobile terminal or the server and a processor classifies the state of the road surface as any one of the dry state, the wet state, the snow covered state, and the icy state based on at least one of the time information, the season information, and the weather information, the stereo images received from the stereo camera, and the road surface data. Consequently, it is possible to recognize the state of the road surface.

On the other hand, the processor generates and outputs at least one of a brake drive signal and a steering drive signal corresponding to a current vehicle travel path or an expected vehicle travel path and classified road surface state information. Consequently, it is possible to stably drive the vehicle based on the state of the road surface.

Meanwhile, in detection of an object based on the stereo images, it is possible to calculate a disparity using the stereo images and to detect an object based on the disparity information, thereby reducing data processing time.

Any reference in this specification to "one embodiment," "an embodiment," "example embodiment," and the like, means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A driver assistance apparatus comprising:
a communication unit to exchange data with a mobile terminal or a server;
a stereo camera to acquire stereo images;
a memory to store road surface data regarding a state of a road surface classified into a dry state, a wet state, a snow covered state, or an icy state; and
a processor to classify a current state of the road surface as any one of the dry state, the wet state, the snow covered state, or the icy state based on the stereo images and the road surface data, wherein the communication unit transmits the stereo images from the stereo camera and position and time information corresponding to the stereo images to the mobile terminal or the server wherein the communication unit receives weather information from the mobile terminal or the server, wherein the processor is configured to classify a current state of the road surface as any one of the dry state, the wet state, the snow covered state, or the icy state based on the weather information, the stereo images, and the road surface data, and wherein when a brake is operated, the processor is configured to output a brake operation weighting signal based on the classified current state of the road surface to a brake drive that drives the brake.

2. The driver assistance apparatus according to claim 1, wherein the processor calculates a disparity between the stereo images, detects a road surface in the stereo images based on the disparity between the stereo images, and classifies the state of the road surface as any one of the dry state, the wet state, the snow covered state, or the icy state based on data related to the detected road surface and the road surface data stored in the memory.

3. The driver assistance apparatus according to claim 1, wherein the processor includes a road surface pattern detector to classify the state of the road surface as any one of the dry state, the wet state, the snow covered state, or the icy state based on the data related to the road surface in the stereo images and the road surface data stored in the memory.

4. The driver assistance apparatus according to claim 2, wherein the processor classifies the state of the road surface as any one of the dry state, the wet state, the snow covered state, or the icy state based on brightness data of the data related to the road surface in the stereo images and the road surface data stored in the memory.

5. The driver assistance apparatus according to claim 2, wherein the processor classifies the state of the road surface as any one of the dry state, the wet state, the snow covered state, or the icy state based on frequency spectra of the data related to the road surface in the stereo images and the road surface data stored in the memory.

6. The driver assistance apparatus according to claim 1, wherein the road surface data stored in the memory are image data having position and time information.

7. The driver assistance apparatus according to claim 1, further including:
a display unit and an audio output, and wherein the processor controls at least one of the classified road surface state information or brake drive guidance information and steering drive guidance information corresponding to the classified road surface state information through at least one of the display or the audio output.

8. The driver assistance apparatus according to claim 1, wherein the processor generates and outputs at least one Of a brake drive signal or a steering drive signal corresponding to the classified road surface state information.

9. The driver assistance apparatus according to claim 1, wherein the communication unit receives the road surface data regarding the state of the road surface classified into the dry state, the wet state, the snow covered state, or the icy state from the mobile terminal or the server.

10. The driver assistance apparatus according to claim 1, wherein the communication unit further receives season information, and the processor classifies the state of the road surface as any one of the dry state, the wet state, the snow covered sure or the icy state further based on the season information, the stereo images received from the stereo camera, and the road surface data.

11. The driver assistance apparatus according to claim 1, wherein the communication unit transmits a current vehicle travel path or an expected vehicle travel path to the mobile terminal or the server and receives the road surface data classified into the dry state, the wet state, the snow covered state, or the icy state corresponding to the current vehicle travel path or the expected vehicle travel path from the mobile terminal or the server.

12. The driver assistance apparatus according to claim 9, wherein the processor generates and outputs at least one of a brake drive signal or a steeling drive signal corresponding to the current vehicle travel path or the expected vehicle travel path and the classified road surface state information.

13. A vehicle comprising:
a steering drive to drive a steering apparatus;
a brake drive to drive a brake;
a controller to control the steering drive and the brake drive;
a communication unit to exchange data with a mobile terminal or a server;
a stereo camera;
a memory to store road surface data regarding a state of a road surface classified into a dry state, a wet state, a snow covered state, or an icy state; and
a processor to classify a current state of the road surface as any one of the dry state, the wet state, the snow covered state, or the icy state based on the stereo images and the road surface data, wherein the communication unit transmits the stereo images from the stereo camera and position and time information corresponding to the stereo images to the mobile terminal or the server, wherein the communication unit receives weather information from the mobile terminal or the server, wherein the processor is configured to classify a current state of the road surface as any one of the dry state, the wet state, the snow covered state, or the icy state based on the weather information, the stereo images and the road surface data, and wherein when the brake is operated, the processor is configured to output a brake operation weighting signal based on the classified current state of the road surface to the brake drive.

14. The vehicle according to claim 13, wherein the processor calculates a disparity between the stereo images, detects a road surface in the stereo images based on the disparity information between the stereo images, and classifies the state of the road surface as any one of the dry state, the wet state, the snow covered state, or the icy state based on data related to the detected road surface and the road surface data stored in the memory.

15. The vehicle according to claim 14, wherein the processor classifies the state of the road surface as any one of the dry state, the wet state, the snow covered state, or the icy state based on brightness data of the data related to the road surface in the stereo images and the road surface data stored in the memory.

16. The vehicle according to claim 14, wherein the processor classifies the state of the road surface as any one of the dry state, the wet state, the snow covered state, or the icy state based on frequency spectra of the data related to the road surface in the stereo images and the road surface data stored in the memory.

17. The vehicle according to claim 13,
wherein the communication unit receives the road surface data regarding the state of the road surface classified into the dry state, the wet state, the snow covered state, or the icy state from the mobile terminal or the server.

18. The vehicle according to claim 13,
wherein the communication unit receives information from the mobile terminal or the server, and the processor classifies the state of the road surface as any One of the dry state, the wet state, the snow coveted state, or the icy state further based on the season information, the stereo images received from the stereo camera, and the road surface data.

19. The vehicle according to claim 13,
wherein the communication unit transmits a current vehicle travel path or an expected vehicle travel path to the mobile terminal or the server and receives the road surface data classified into the dry state, the wet state, the snow covered state, or the icy state corresponding to the current vehicle travel path or the expected vehicle travel path from the mobile terminal or the server.

20. The vehicle according to claim 17, wherein the processor generates and outputs at least one of a brake drive signal or a steering drive signal corresponding to the current vehicle travel path or the expected vehicle travel path and the classified road surface state information.

* * * * *